(12) United States Patent
Elford et al.

(10) Patent No.: US 10,003,396 B2
(45) Date of Patent: Jun. 19, 2018

(54) DISTRIBUTED BROADBAND WIRELESS IMPLEMENTATION IN PREMISES ELECTRICAL DEVICES

(71) Applicant: CenturyLink Intellectual Property LLC, Denver, CO (US)

(72) Inventors: Michael L. Elford, Calhoun, LA (US); Pasha G. Mohammed, Monroe, LA (US); Thomas Schwengler, Lakewood, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days. days.

(21) Appl. No.: 15/393,532

(22) Filed: Dec. 29, 2016

(65) Prior Publication Data
US 2018/0069617 A1      Mar. 8, 2018

Related U.S. Application Data

(60) Provisional application No. 62/384,014, filed on Sep. 6, 2016.

(51) Int. Cl.
*H04B 7/185*     (2006.01)
*H04B 7/155*     (2006.01)
(Continued)

(52) U.S. Cl.
CPC .... *H04B 7/15507* (2013.01); *H04W 52/0206* (2013.01); *H04W 88/08* (2013.01)

(58) Field of Classification Search
CPC ........ B64C 2201/066; B64C 2201/146; B64C 39/024; F21K 9/20; F21S 9/022;
(Continued)

(56) References Cited

U.S. PATENT DOCUMENTS

| 5,630,204 A * | 5/1997 | Hylton | H04L 12/2801 |
| | | | 348/E7.05 |
| 2002/0065711 A1* | 5/2002 | Fujisawa | G06Q 30/0601 |
| | | | 705/13 |

(Continued)

*Primary Examiner* — Tan H Trinh
(74) *Attorney, Agent, or Firm* — Swanson & Bratschun, L.L.C.

(57) ABSTRACT

Novel tools and techniques might provide for implementing broadband wireless distribution, and, in particular embodiments, to methods, systems, apparatus, and computer software for implementing distributed broadband wireless implementation in premises electrical devices. In various embodiments, a first wireless distribution device may be disposed within a premises (electrical) device. A first switching device of the first wireless distribution device might switchably supply power to the premises device via a power line, the supplied power enabling the premises device to perform its designed functionalities. Meanwhile, a first wireless transceiver of the first wireless distribution device (to which is supplied with constant power from a power source) might relay wireless communications between a service provider access point and a premises-based wireless network. In this manner, premises electrical devices can be converted into wireless communications relay devices (to extend wireless communications coverage, to boost existing wireless communications, etc.) without affecting their designed functionalities.

24 Claims, 10 Drawing Sheets

(51) Int. Cl.
*H04W 52/02* (2009.01)
*H04W 88/08* (2009.01)

(58) Field of Classification Search
CPC ............. F21V 33/0056; F21V 33/0076; F21Y
2115/10; G05D 1/0011; H01J 61/56;
H01K 1/62; H04W 88/08
USPC .... 455/7, 11.1, 13.1, 41.1, 41.2, 552.1, 561,
455/572, 573, 292, 13.4, 9, 67.11, 452.1;
375/219; 340/310.11, 70.11; 700/275,
700/28, 22; 348/77; 315/291; 323/293
See application file for complete search history.

(56) References Cited

U.S. PATENT DOCUMENTS

| | | | | |
|---|---|---|---|---|
| 2004/0113757 | A1* | 6/2004 | White, II | H04B 3/56 702/62 |
| 2005/0012395 | A1* | 1/2005 | Eckroad | H02J 3/16 307/44 |
| 2006/0146581 | A1* | 7/2006 | Murphy | H02B 1/34 363/37 |
| 2007/0201540 | A1* | 8/2007 | Berkman | H04B 3/542 375/219 |
| 2008/0106425 | A1* | 5/2008 | Deaver | G01R 19/16547 340/646 |
| 2008/0143491 | A1* | 6/2008 | Deaver | H04B 3/542 370/463 |
| 2010/0073193 | A1* | 3/2010 | Flammer, III | H04B 3/546 340/870.11 |
| 2010/0145542 | A1* | 6/2010 | Chapel | H02J 13/0082 700/295 |
| 2011/0018704 | A1* | 1/2011 | Burrows | H04B 3/54 340/538 |
| 2012/0136485 | A1* | 5/2012 | Weber | G05B 15/02 700/275 |
| 2012/0259965 | A1* | 10/2012 | Tsuzuki | H04L 41/0213 709/223 |
| 2013/0201316 | A1* | 8/2013 | Binder | H04L 67/12 348/77 |
| 2013/0261774 | A1* | 10/2013 | Lu | H04L 12/2807 700/90 |
| 2013/0261821 | A1* | 10/2013 | Lu | H04L 12/2807 700/289 |
| 2013/0272044 | A1* | 10/2013 | Boys | H02J 5/005 363/126 |
| 2014/0001977 | A1* | 1/2014 | Zacharchuk | H04L 12/2816 315/291 |
| 2014/0218002 | A1* | 8/2014 | Yang | H02M 3/156 323/293 |
| 2014/0334202 | A1* | 11/2014 | Cameron | H02J 5/00 363/56.01 |
| 2015/0003136 | A1* | 1/2015 | Inomata | H02M 5/293 363/163 |
| 2015/0042240 | A1* | 2/2015 | Aggarwal | H04L 12/2803 315/292 |
| 2015/0066227 | A1* | 3/2015 | Chapel | H04L 12/4633 700/295 |
| 2015/0156830 | A1* | 6/2015 | Ma | H05B 33/0815 315/291 |
| 2015/0207716 | A1* | 7/2015 | Sexton | H04L 43/10 370/241 |
| 2015/0259078 | A1* | 9/2015 | Filipovic | H04W 88/08 244/114 R |
| 2015/0295488 | A1* | 10/2015 | Shen | H02M 1/32 363/50 |
| 2015/0300892 | A1* | 10/2015 | Malhotra | G01K 13/00 700/276 |
| 2015/0382436 | A1* | 12/2015 | Kelly | G08C 17/02 315/131 |
| 2016/0020691 | A1* | 1/2016 | Yoon | H02M 1/4258 323/284 |
| 2016/0148499 | A1* | 5/2016 | Hicks, III | H04L 12/6418 340/506 |
| 2016/0167234 | A1* | 6/2016 | Angle | H04L 12/282 701/2 |
| 2016/0226207 | A1* | 8/2016 | Fullerton | H01R 31/065 |
| 2017/0026916 | A1* | 1/2017 | Velu | H04W 52/283 |
| 2017/0027032 | A1* | 1/2017 | Kong | G09G 3/32 |
| 2017/0099518 | A1* | 4/2017 | Hsueh | H04N 21/4432 |
| 2017/0110784 | A1* | 4/2017 | Vermes | H01Q 1/2291 |
| 2017/0154387 | A1* | 6/2017 | Somers | G06Q 50/06 |
| 2017/0244934 | A1* | 8/2017 | Chien | H04N 7/181 |
| 2017/0290115 | A1* | 10/2017 | Kong | G09G 3/32 |
| 2017/0307109 | A1* | 10/2017 | McCarter | F16L 7/00 |
| 2017/0317494 | A1* | 11/2017 | Chapel | G05B 15/02 |
| 2018/0041071 | A1* | 2/2018 | Chapel | H02J 13/0082 |

* cited by examiner

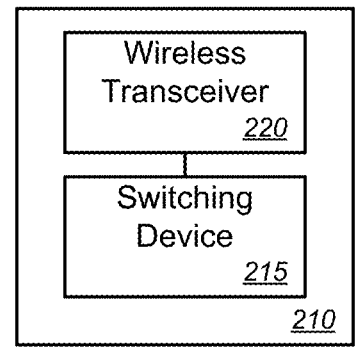
200  Fig. 2A
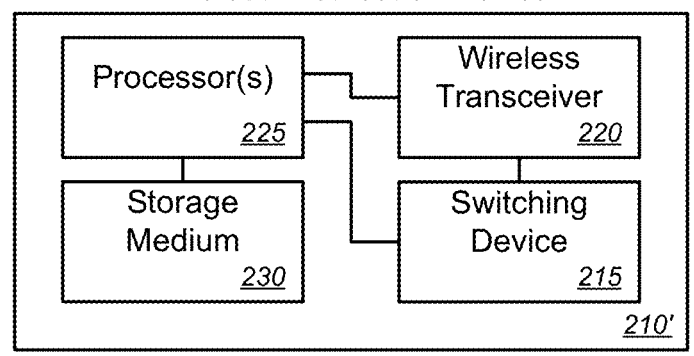
200'  Fig. 2B

DISTRIBUTED BROADBAND WIRELESS IMPLEMENTATION IN PREMISES ELECTRICAL DEVICES

CROSS-REFERENCES TO RELATED APPLICATIONS

This application claims priority to U.S. Patent Application Ser. No. 62/384,014 (the "'014 application"), filed Sep. 6, 2016 by Michael L. Elford et al., entitled, "Distributed Broadband Wireless Around Home Electrical Devices," the disclosure of which is incorporated herein by reference in its entirety for all purposes.

This application may also be related to U.S. patent application Ser. No. 14/973,470 (the "'470 application"), filed Dec. 17, 2015 by Michael L. Elford et al., entitled, "Apical Filler Layers," which claims priority to U.S. Patent Application Ser. No. 62/188,110 (the "'110 application"), filed Jul. 2, 2015 by Michael L. Elford et al., entitled, "Apical Filler Layers"; U.S. patent application Ser. No. 14/973,460 (the "'460 application"), filed Dec. 17, 2015 by Thomas Schwengler et al., entitled, "Apical Radiator," which claims priority to U.S. Patent Application Ser. No. 62/127,701 (the "'701 application"), filed Mar. 3, 2015 by Thomas Schwengler et al., entitled, "Apical Radiator" and U.S. Patent Application Ser. No. 62/188,100 (the "'100 application"), filed Jul. 2, 2015 by Thomas Schwengler et al., entitled, "Apical Radiator"; U.S. patent application Ser. No. 14/973,458 (the "'458 application"), filed Dec. 17, 2015 by Thomas C. Barnett, Jr. et al., entitled, "Touchless Fiber Network," which claims priority to U.S. Patent Application Ser. No. 62/127,699 (the "'699 application"), filed Mar. 3, 2015 by Thomas C. Barnett, Jr. et al., entitled, "Touchless Fiber Network"; and U.S. patent application Ser. No. 14/971,243 (the "'243 application"), filed Dec. 16, 2015 by Michael L. Elford et al., entitled, "MediaLink Interconnection Box," which claims priority to U.S. Patent Application Ser. No. 62/109,757 (the "'757 application"), filed Jan. 30, 2015 by Michael L. Elford et al., entitled, "MediaLink Interconnection Box (MIB)."

This application may be related to U.S. patent application Ser. No. 14/578,851 (the "'851 application"), filed Dec. 22, 2014 by Michael L. Elford et al., entitled, "Point-to-Point Fiber Insertion," which claims priority to U.S. Patent Application Ser. No. 61/939,109 (the "'109 application"), filed Feb. 12, 2014 by Michael L. Elford et al., entitled, "Point-to-Point Fiber Insertion." This application is also a continuation-in-part application of U.S. patent application Ser. No. 14/517,574 (the "'574 application"), filed on Oct. 17, 2014 by Michael L. Elford et al., entitled, "Fiber-to-the-Premises (FTTP) Methods and Systems," which claims priority to U.S. Patent Application Ser. No. 61/893,034 (the "'034 application"), filed Oct. 18, 2013 by Michael L. Elford et al., entitled, "Fiber-to-the-Home (FTTH) Methods and Systems."

This application may be related to U.S. Patent Application Ser. No. 61/874,691 (the "'691 application"), filed Sep. 6, 2013 by Thomas Schwengler et al., entitled, "Wireless Distribution Using Cabinets, Pedestals, and Hand Holes"; U.S. patent application Ser. No. 14/316,676 (the "'676 application"), filed on Jun. 26, 2014 by Thomas Schwengler et al., entitled, "Wireless Distribution Using Cabinets, Pedestals, and Hand Holes," which claims priority to the '691 application"; U.S. Patent Application Ser. No. 61/861,216, filed Aug. 1, 2013 by Thomas Schwengler et al., entitled, "Wireless Access Point in Pedestal or Hand Hole"; and U.S. patent application Ser. No. 14/316,665 (the "'665 application"), filed on Jun. 26, 2014 by Thomas Schwengler et al., entitled, "Wireless Access Point in Pedestal or Hand Hole," which claims priority to the '216 application. This application may also be related to U.S. Patent Application Ser. No. 61/793,514 (the "'514 application"), filed Mar. 15, 2013 by Erez N. Allouche et al., entitled, "Cast-in-Place Fiber Technology"; U.S. patent application Ser. No. 14/209,754 (the "'754 application"), filed Mar. 13, 2014 by Erez N. Allouche et al., entitled, "Cast-in-Place Fiber Technology," which claims priority to the '514 application; U.S. Patent Application Ser. No. 61/604,020 (the "'020 application"), filed Feb. 28, 2012 by Michael L. Elford et al., entitled, "Apical Conduit and Methods of Using Same," U.S. Patent Application Ser. No. 61/636,227 (the "'227 application"), filed Apr. 20, 2012 by Michael L. Elford et al., entitled, "Apical Conduit and Methods of Using Same"; and U.S. patent application Ser. No. 13/779,488 (the "'488 application"), filed Feb. 27, 2013 by Michael L. Elford et al., entitled, "Apical Conduit and Methods of Using Same," which claims priority to the '020 and '227 applications.

This application may also be related to U.S. Patent Application Ser. No. 62/384,023 (the "'023 application"), filed Sep. 6, 2016 by Jonathan J. Vermes et al., entitled, "Radiating Closures."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing broadband wireless distribution, and, in particular embodiments, to methods, systems, apparatus, and computer software for implementing distributed broadband wireless implementation in premises electrical devices.

BACKGROUND

Although wireless relay devices are currently on the market, such conventional wireless relay devices are stand-alone devices. There do not appear to be any wireless relay or wireless distribution devices that are designed to fit within or be disposed within conventional or existing electrical devices (e.g., premises electrical devices, etc.) that provide wireless relay or distribution from within such existing electrical devices, while enabling the existing electrical devices to function according to its normal or designed manner.

Hence, there is a need for more robust and scalable solutions for implementing broadband wireless distribution, and, in particular embodiments, to methods, systems, apparatus, and computer software for implementing distributed broadband wireless implementation in premises electrical devices.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 2A and 2B are schematic diagrams illustrating various embodiments of a wireless distribution device for implementing distributed broadband wireless implementation in premises electrical devices.

DETAILED DESCRIPTION OF CERTAIN EMBODIMENTS

Overview

Figure 1:
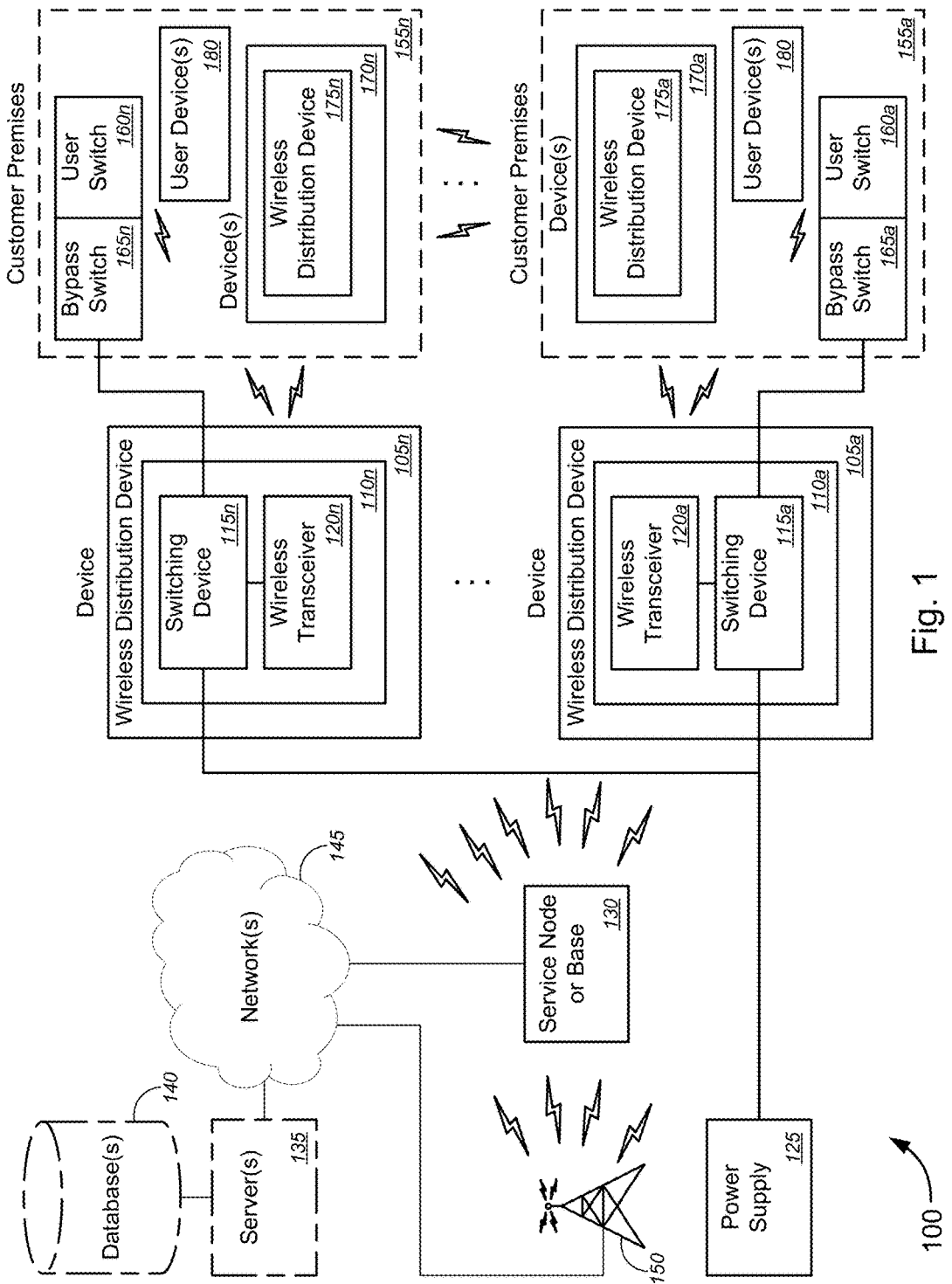
FIG. 1 is a schematic diagram illustrating a system for implementing distributed broadband wireless implementation in premises electrical devices, in accordance with various embodiments.

Various embodiments provide tools and techniques for implementing broadband wireless distribution, and, in particular embodiments, to methods, systems, apparatus, and computer software for implementing distributed broadband wireless implementation in premises electrical devices.

In various embodiments, a first wireless distribution device may be disposed within a premises (electrical) device. A first switching device of the first wireless distribution device might switchably supply power to the premises device via a power line, the supplied power enabling the premises device to perform its designed functionalities. Meanwhile, a first wireless transceiver of the first wireless distribution device (to which is supplied with constant power from a power source) might relay wireless communications between a service provider access point and a premises-based wireless network. In this manner, premises electrical devices can be converted into wireless communications relay devices (to extend wireless communications coverage, to boost existing wireless communications, etc.) without affecting their designed functionalities.

In some embodiments, the premises device might include, but is not limited to, one of a lamp post light, a landscape light, a porch light, a patio light, a garage light, an indoor room light, an indoor lamp, a night light, a fan, a security camera, a security alarm, a sensor device, a motion detector, or an electrical outlet, and/or the like. In some cases, one or more user devices—which might each include, without limitation, one of a tablet computer, a desktop computer, a laptop computer, a smart phone, a mobile phone, a portable gaming device, a remote control device, or a personal digital assistant, and/or the like—might be used to remotely control the first switching device. Alternatively, or additionally, a bypass switch at a wall switch location might provide constant power to the first wireless transceiver while signaling the first switching device to turn on or off the premises device, based on user input via the wall switch.

The various embodiments described herein focus on utilizing convenient locations near, around, or on a home to provide a wireless link between a network location and a home. This is intended for use with wireless links such as fixed and mobile wireless links (including, but not limited to, WiMAX, LTE, cellular, in the standard bands including, without limitation, TV white spaces, 600 MHz, 700 MHz, cellular, PCS, AWS, and/or the like, but also in higher bands for considerations in 5G including, without limitation, 24, 28, 31, 37, 39, 42, 47, 50, 60, 70, 80, 95 GHz and above). The various embodiments use existing installations or devices, and possibly modify some of their electrical wiring or powering setups in order to ensure continuous powering.

The various embodiments provide relatively low cost broadband wireless distribution in an efficient way that reaches across customer property lines to reach the last feet (rather than just the last mile), in some cases, from a public location across a front lawn of a customer premises.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, wireless communications technology, network distribution technology, broadband wireless technology, and/or the like. In other aspects, certain embodiments, can improve the functioning of user equipment or systems themselves (e.g., telecommunications equipment, wireless communications equipment, broadband wireless communications equipment, premises devices or equipment, etc.), for example, by replacing wiring and other electrical connections within existing premises electrical devices (or adding a switching device and wireless transceiver in newly built premises electrical devices) that enable switchably supplying, with the switching device that is disposed within the premises electrical device, power to the premises electrical device via a power line (the supplied power enabling the premises device to perform its designed functionalities), while relaying, with the wireless transceiver, wireless communications between a service provider access point and a premises-based wireless network, and/or the like. In particular, to the extent any abstract concepts are present in the various embodiments, those concepts can be implemented as described herein by devices, software, systems, and methods that involve specific novel functionality (e.g., steps or operations), such as switchably supplying, with the switching device that is disposed within the premises electrical device, power to the premises electrical device via a power line (the supplied power enabling the premises device to perform its designed functionalities), while relaying, with the wireless transceiver, wireless communications between a service provider access point and a premises-based wireless network, and/or the like, to name a few examples, that extend beyond mere conventional computer processing operations. These functionalities can produce tangible results outside of the implementing computer system, including, merely by way of example, providing relatively low cost broadband wireless distribution in an efficient way that reaches across customer property lines to reach the last feet (rather than just the last mile), by using wireless distribution or relay devices within existing or new premises electrical devices, by extending wireless communications coverage, by boosting existing wireless communications, and/or the like, which may be observed or measured by customers and/or service providers.

In an aspect, a method might comprise switchably supplying, with a first switching device of a first wireless distribution device that is disposed within a premises device, power to the premises device via a power line, the supplied power enabling the premises device to perform its designed functionalities. The method might further comprise relaying, with a first wireless transceiver of the first wireless distribution device, wireless communications between a service provider access point and a premises-based wireless network.

In some embodiments, the premises device might comprise one of a lamp post light, a landscape light, a porch light, a patio light, a garage light, an indoor room light, an indoor lamp, a night light, a fan, a security camera, a security alarm, a sensor device, a motion detector, or an electrical outlet, and/or the like.

According to some embodiments, the first switching device might comprise a smart switch that allows the power that is supplied to the premises device to be switched on or off while maintaining constant power to the first wireless transceiver. In some cases, the smart switch might be remotely controllable via at least one of the power line using a power-line signal or a wireless communication link established between a user device and the smart switch. In some instances, the user device might comprise one of a tablet computer, a desktop computer, a laptop computer, a smart phone, a mobile phone, a portable gaming device, a remote control device, or a personal digital assistant, and/or the like.

In some embodiments, the smart switch might be communicatively coupled via the power line to a wall-plate device that controls the smart switch and that is located within a first customer premises. The wall-plate device might comprise a second wireless transceiver, and relaying the wireless communications between the service provider access point and the premises-based wireless network might comprise relaying, with the first wireless transceiver, the wireless communications between the service provider access point and the premises-based wireless network using broadband-over-power signals via the power line between the smart switch and the second wireless transceiver.

In some cases, the first wireless distribution device might comprise a bulb socket that is configured to receive a conventional bulb. When the conventional bulb is inserted in the bulb socket, the smart switch might allow power that is supplied to the bulb socket and to the conventional bulb to be switched on or off while maintaining constant power to the first wireless transceiver. Alternatively, the premises device might be a lighting device, the first wireless distribution device might comprise a smart bulb, and the smart bulb might allow the power that is supplied to the lighting device to be switched on or off, while maintaining constant power to the first wireless transceiver.

Merely by way of example, in some instances, the method might further comprise relaying, with the first wireless transceiver, wireless communications between at least one of the service provider access point or the premises-based wireless network and a second wireless distribution device, or the like. In some embodiments, the second wireless distribution device might be located within a first customer premises within which the first wireless distribution device is located. Alternatively, the second wireless distribution device might be located within a second customer premises that is different from a first customer premises within which the first wireless distribution device is located. According to some embodiments, the second wireless distribution device might be mounted on one of a roof-top, a venting pipe, a roof-protruding pipe, a side wall of a building, a louvered side panel, or a vented side panel, and/or the like.

In another aspect, an apparatus might be provided that is disposed within a premises device. The apparatus might comprise a first switching device that switchably supplies power to the premises device via a power line, the supplied power enabling the premises device to perform its designed functionalities; and a first wireless transceiver that relays wireless communications between a service provider access point and a premises-based wireless network.

In some embodiments, the premises device might comprise one of a lamp post light, a landscape light, a porch light, a patio light, a garage light, an indoor room light, an indoor lamp, a night light, a fan, a security camera, a security alarm, a sensor device, a motion detector, or an electrical outlet, and/or the like.

According to some embodiments, the first switching device might comprise a smart switch that allows the power that is supplied to the premises device to be switched on or off while maintaining constant power to the first wireless transceiver. In some cases, the smart switch might be remotely controllable via at least one of the power line using a power-line signal or a wireless communication link established between a user device and the smart switch. In some instances, the user device might comprise one of a tablet computer, a desktop computer, a laptop computer, a smart phone, a mobile phone, a portable gaming device, a remote control device, or a personal digital assistant, and/or the like.

In some embodiments, the smart switch might be communicatively coupled via the power line to a wall-plate device that controls the smart switch and that is located within a first customer premises. The wall-plate device might comprise a second wireless transceiver, and relaying the wireless communications between the service provider access point and the premises-based wireless network might comprise relaying, with the first wireless transceiver, the wireless communications between the service provider access point and the premises-based wireless network using broadband-over-power signals via the power line between the smart switch and the second wireless transceiver.

In some cases, the first wireless distribution device might comprise a bulb socket that is configured to receive a conventional bulb. When the conventional bulb is inserted in the bulb socket, the smart switch might allow power that is supplied to the bulb socket and to the conventional bulb to be switched on or off while maintaining constant power to the first wireless transceiver. Alternatively, the premises device might be a lighting device, the first wireless distribution device might comprise a smart bulb, and the smart bulb might allow the power that is supplied to the lighting device to be switched on or off, while maintaining constant power to the first wireless transceiver.

Merely by way of example, in some instances, the method might further comprise relaying, with the first wireless transceiver, wireless communications between at least one of the service provider access point or the premises-based wireless network and a second wireless distribution device, or the like. In some embodiments, the second wireless distribution device might be located within a first customer premises within which the first wireless distribution device is located. Alternatively, the second wireless distribution device might be located within a second customer premises that is different from a first customer premises within which the first wireless distribution device is located. According to some embodiments, the second wireless distribution device might be mounted on one of a roof-top, a venting pipe, a roof-protruding pipe, a side wall of a building, a louvered side panel, or a vented side panel, and/or the like.

In yet another aspect, a wireless distribution device might be provided that is disposed within a premises device. The wireless distribution device might comprise a first switching device; a first wireless transceiver; at least one processor communicatively coupled to the first switching device and the first wireless transceiver; and a non-transitory computer readable medium communicatively coupled to the at least one processor, the non-transitory computer readable medium having stored thereon computer software comprising a set of instructions that, when executed by the at least one processor, causes the wireless distribution device to: switchably supply power to the premises device via a power line, the supplied power enabling the premises device to perform its designed functionalities; and relay wireless communications between a service provider access point and a premises-based wireless network.

In still another aspect, a system might comprise a wireless distribution device that is disposed within a premises device and a bypass power switch that is disposed within a customer premises. The wireless distribution device might comprise a first switching device that switchably supplies power to the premises device via a power line, the supplied power enabling the premises device to perform its designed functionalities; and a first wireless transceiver that relays wireless communications between a service provider access point and a premises-based wireless network. The bypass power switch might comprise a bypass power line that supplies constant power from a power supply to the first wireless transceiver of the wireless distribution device; and a user input device that detects user input indicating to power on or off the premises device and that sends a signal to the first switching device via at least one of the power line using a power-line signal or a wireless communication link established between a user input device and the first switching device.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-7 illustrate some of the features of the method, system, and apparatus for implementing broadband wireless distribution, and, in particular embodiments, to methods, systems, apparatus, and computer software for implementing distributed broadband wireless implementation in premises electrical devices, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a schematic diagram illustrating a system 100 for implementing distributed broadband wireless implementation in premises electrical devices, in accordance with various embodiments.

In the non-limiting embodiment of FIG. 1, system 100 might comprise one or more devices 105a-105n (collectively, "devices 105," "premises devices 105," "outdoor devices 105," or "outdoor premises devices 105," or the like), one or more wireless distribution devices 110a-110n (collectively, "wireless distribution devices 110," "devices 110," or the like), one or more switching devices 115a-115n (collectively, "switching device 115," "smart switch 115," "switch 115," or the like), one or more wireless transceivers 120*a*-120*n* (collectively, "wireless transceivers 120," "transceivers 120," or the like), a power supply 125, a service node or base 130, one or more servers 135 (collectively, "service provider servers 135," "network servers 135," "servers 135," or the like), one or more databases 140 associated with the one or more servers 135, network(s) 145, and one or more telecommunications relay systems 150, and/or the like. System 100 might further comprise one or more customer premises 155*a*-155*n* (collectively, "customer premises 155," "premises 155," locations 155," or the like), one or more user switches 160*a*-160*n* (collectively, "user switches 160," "wall switches 160," "switches 160," or the like), one or more bypass switches 165*a*-165*n* (collectively, "bypass switches 165," "switches 165," or the like), one or more devices 170*a*-170*n* (collectively, "devices 170," "premises devices 170," "indoor devices 170," or "indoor premises devices 170," or the like), one or more wireless distribution devices 175*a*-175*n* (collectively, "wireless distribution devices 175," "devices 110," or the like), and one or more user devices 180 (collectively, "user devices 180," "devices 180," or the like), and/or the like.

In some embodiments, each wireless distribution device 110 might be disposed within each device 105; for example, wireless distribution device 110*a* might be disposed within each device 105*a*, wireless distribution device 110*b* might be disposed within each device 105*b* (not shown), and so on, such that wireless distribution device 110*n* might be disposed within each device 105*n*. Herein, the wireless distribution device 110 being disposed within the device 105 might refer to the wireless distribution device 110 extending from an inner portion to an outer portion of the device 105, or to the wireless distribution device 110 being disposed on or otherwise affixed to an external portion of the device 105, or the like. Each wireless distribution device 110, according to some embodiments, might include, without limitation, a switching device 115 and a wireless transceiver 120.

Disposed within each of the customer premises 155 might be at least one user switch 160 and at least one bypass switch 165 (or at least one user device 180). When a user actuates a user switch 160 (for example, user switch 160*a*) that is communicatively coupled (at least indirectly) to device 105 (for example, device 105*a*) (e.g., to turn on or off the power to the device 105, to change a mode of operation of the device 105, or the like), or alternatively uses a user device 180 to remotely control the device 105 (e.g., device 105*a*) (e.g., to turn it on or off, to change its operational mode, or the like), the bypass switch 165 might receive such user input and might signal a switching device 115 of a wireless distribution device 110 that is disposed in the device 105 (for example, switching device 115*a* of wireless distribution device 110*a* that is disposed in device 105*a*) either via powerline (data) signal over the power line connecting the bypass switch 165 (e.g., switch 165*a*) to the switching device 115 (e.g., switch 115*a*) or via wireless connection established between the bypass switch 165 (e.g., switch 165*a*) and the switching device 115 (e.g., switch 115*a*) to supply or stop power to the device 105 based at least in part on the current power state of the device 105 (i.e., whether currently on or off) and at least in part on the user input (i.e., whether to turn on or off, or whether to change modes, etc.). For example, for user input indicating to turn the premises device 105 (e.g., device 105*a*) on or to set an operational mode of the premises device when the device is in the off state, the switching device 115 (e.g., switching device 115*a*) might close the circuit to supply the power from the power supply 125 to the premises device (e.g., device 105*a*). For user input indicating to turn the premises device (e.g., device 105*a*) off when the device is in the on state, the switching device 115 (e.g., switching device 115*a*) might open the circuit to cut the supply of power from the power supply 125 to the premises device (e.g., device 105*a*). For user input indicating to change the operational mode of the premises device 105 (e.g., device 105*a*) when the premises device is already in the on state, the first switching device might maintain the circuit in the closed state to continue supplying the power from the power supply 125 to the premises device (e.g., device 105*a*), while relaying the signal to change operational modes to a component of the device 105 that can receive such signal and can cause the device to change modes (if the device is not already in the indicated mode).

In any event, the bypass switch 165 (in some cases, in conjunction with the switching device 115) might be configured to supply constant power from the power supply 125 to the wireless transceiver 120 (e.g., wireless transceiver 120*a*). The wireless transceiver 120 (e.g., wireless transceiver 120*a*) might relay wireless communication between a service provider access point (including, but not limited to, service node or base 130, a signal distribution device or pedestal (as shown and described below with respect to FIG. 3), or the like) and a premises-based wireless network (e.g., LAN 350 of FIG. 3, or the like), to which might be connected one or more of at least one device 170 (e.g., device 170*a*, or the like), at least one user device 180, and/or the like. In some cases, the service provider access point might communicatively couple with one or more servers 135 (and associated databases 140) via the network(s) 145 (and in some cases, via the one or more telecommunications relay systems 150, which might include, without limitation, one or more wireless network interfaces (e.g., wireless modems, wireless access points, and the like), one or more towers, one or more satellites, and/or the like). The server(s) 135 and/or the network(s) 145 (e.g., the Internet or the like) might exchange data (including, but not limited to, media content, information, VoIP communications, messaging communications (e.g., e-mail messages, short message service ("SMS") messages, chat messages, multimedia messaging service ("MMS") messages, and/or the like), etc.) with one or more user devices 180 or other devices via the wireless transceiver 120 (e.g., wireless transceiver 120*a*) of one or more devices 105 (e.g., device 105*a*), and in some cases, also via wireless distribution devices 175 (e.g., wireless distribution device 175*a* of device 170*a*) or the like. According to some embodiments, wireless distribution devices 175 in one customer premises 155 might relay wireless communications from one or more wireless transceivers 120 to other wireless distribution devices 175 in other customer premises 155. For example, the service node 130 might be located near device 105*a*, which is near customer premises 155*a*, but might be somewhat distant (or perhaps out of wireless range with respect to customer premises 155*n*). In such a case, the wireless transceiver 120*a* (of wireless distribution device 110*a* disposed in device 105*a*) might relay the wireless communications to user device 180 in customer premises 155*n*, via wireless distribution device 175*a* (disposed in device 170*a* and located in customer premises 155*a*) and via wireless distribution device 175*n* (disposed in device 170*n* and located in customer premises 155*n*) (and via any intermediate wireless distribution devices 175 disposed in devices 170 that are located in intermediate customer premises 155 between customer premises 155*a* and 155*n*). In this manner, the wireless distribution devices 110 and 170 might relay using any suitable number of hops to connect any user device 180 or other devices that are perhaps not within wireless range of the service node 130. Alternatively, or additionally, user device 180 or other devices might be within wireless range of service node 130 or some other wireless router or node, but the signal from these sources might be weak (or bandwidth might otherwise be low), in which case, the multiple hops via the wireless distribution devices 110 and 170 might supplement the wireless signal so as to boost bandwidth or network speed, or the like.

Merely by way of example, in some embodiments, the devices 105 and/or the devices 170 might each include, but is not limited to, one of a lamp post light, a landscape light, a porch light, a patio light, a garage light, an indoor room light, an indoor lamp, a night light, a fan, a security camera, a security alarm, a sensor device, a motion detector, or an electrical outlet, and/or the like. For purposes of illustration, devices 105 might refer to outdoor devices while devices 170 might refer to indoor (or mobile devices). In some cases, the user devices 180 might each include, without limitation, one of a tablet computer, a desktop computer, a laptop computer, a smart phone, a mobile phone, a portable gaming device, a remote control device, or a personal digital assistant, and/or the like.

Architecting broadband wireless systems often face the difficulty of placing an outdoor device at a customer location that can be both well placed for propagation needs (say near a roof, or on an exterior front, side, and/or back wall of a home) and easy to power. The various embodiments described herein focus on utilizing convenient locations near, around, or on a home to provide a wireless link between a network location and a home. This is intended for use with wireless links such as fixed and mobile wireless links (including, but not limited to, WiMAX, LTE, cellular, in the standard bands including, without limitation, TV white spaces, 600 MHz, 700 MHz, cellular, PCS, AWS, and/or the like, but also in higher bands for considerations in 5G including, without limitation, 24, 28, 31, 37, 39, 42, 47, 50, 60, 70, 80, 95 GHz and above). The various embodiments use existing installations or devices, and possibly modify some of their electrical wiring or powering setups in order to ensure continuous powering.

In some embodiments, outdoor lighting can be used—for instance a light or lamp post in the front yard, porch lighting, patio lighting, landscape lighting, and/or the like. Such lighting may have to be rewired to bypass on/off switches, which can often be done cheaper than a new installation; for instance, the old switch is set to always on, so there is always power to the outdoor light—the outdoor light can be simply controlled by a sensor to turn on at night, or in more elaborate embodiments by signaling between a new smart switch (at the location of the old switch) and new smart light (at the location of the old light). The smart switch on/off control of the smart light does not actually turn power on or off, but keeps power up for radio communications, while commanding the smart light to turn on or off. The smart light is a light bulb that can be controlled by power-line signal, or is a smart adaptor with socket to keep a cheaper normal lightbulb. According to some embodiments, the power line can be used to establish a signal or communications between the smart switch and the light, allowing a manual switch or a software application ("app") running on a user device (e.g., smart phone, tablet, or the like) to turn the light on or off. In some cases, broadband-over-power signals can be used over the same power line to bring outdoor wireless signal into the home. A small wall plate device (the same used for bypassing switching or the like) can be used to serve signal indoor. Other broadband-over-power signals can be distributed to the home or can interface with indoor WiFi network or indoor LAN. In some instances, powered devices of a security system (including, but not limited to, cameras, sensors, detectors, alarms, etc.) can be used to co-locate wireless devices. These devices are powered and also have signaling to them (such as video, sensor data, etc.). That signaling can be used to carry broadband signals; that is, broadband-over-power can also be used with such devices.

Further, in some embodiments, some roof-top locations like venting pipes may be convenient locations for implementing the various embodiments, although these locations are typically not powered. For this set of locations, a wireless device can be placed on a roof-protruding pipe (in which case some strengthening/reinforcement might be needed), and power can be easily brought to the rooftop, down the pipe/vent, through a small punched aperture (which would be carefully reclosed, caulked, or sealed, etc.) to an existing power source (e.g., a normal wall socket or outlet). Power and signaling lines (copper or fiber) can be used, or again broadband-over-power lines might be used. Equivalently, in some cases, air vents to attic can be used, whether louvered/vented side panels, or roof-protruding pipes. According to some embodiments, several such locations can be combined to reach other homes. For example, a first home may connect to a wireless service node or base (with the base itself being backhauled by usual methods, including, but not limited to, fiber, passive optical network ("PON"), digital subscriber line ("DSL"), wireless microwave, mesh, and/or the like). The first home's ingress location (powered as outlined above) may be connected to one or more other convenient locations, which can be used for egress to one or more homes nearby. For instance, the scheme can connect home to home over side yards (which are sometimes less obstructed by trees than front or back yards), with as many hops as the architected capacity will allow.

These and other functions of the system 100 (and its components) are described in greater detail above with respect to FIGS. 2-5.

FIGS. 2A and 2B (collectively, "FIG. 2") are schematic diagrams illustrating various embodiments 200 and 200' of a wireless distribution device for implementing distributed broadband wireless implementation in premises electrical devices. FIG. 2A depicts an embodiment 200 that performs wireless communications relaying and power switching both without use of processors or additional software or the like, while FIG. 2B depicts an embodiment 200' that utilizes a processor(s) and software stored in a storage medium to perform one or both of the wireless communications relaying or the power switching.

With reference to the non-limiting embodiment 200 of FIG. 2A, wireless distribution device 210 might comprise a switching device 215 and a wireless transceiver 220. Alternatively, with reference to the non-limiting embodiment of 200' of FIG. 2B, wireless distribution device 210' might comprise a switching device 215, a wireless transceiver 220, a processor(s) 225, and a storage medium 230. The processor(s) 225 might execute software or code that is stored in storage medium 230 to control operation of one or both of the switching device 215 and/or the wireless transceiver 220. The embodiment 200' might, via the software, adapt to changing conditions, and thus, in some cases, the wireless distribution device 210' might be deemed a "smart wireless distribution device," while the embodiment 200 might simply receive input and might perform functionalities of the power switching and/or the wireless communications relaying as relatively passive equipment, and thus, in some instances, the wireless distribution device 200 might be deemed a "dumb wireless distribution device." In either embodiment, the dual functionalities of power switching and/or the wireless communications relaying provide enhancements over conventional devices that typically do only one of these functionalities.

The wireless distribution device 210 or 210', the switching device 215, and the wireless transceiver 220 of the embodiments 200 and 200' of FIG. 2 are otherwise similar, if not identical, to the wireless distribution device 110 or 175, the switching device 115, and the wireless transceiver 120 of system 100 of FIG. 1, respectively, and the descriptions of these components in FIG. 1 apply similarly to the corresponding components in FIG. 2.

Figure 3:
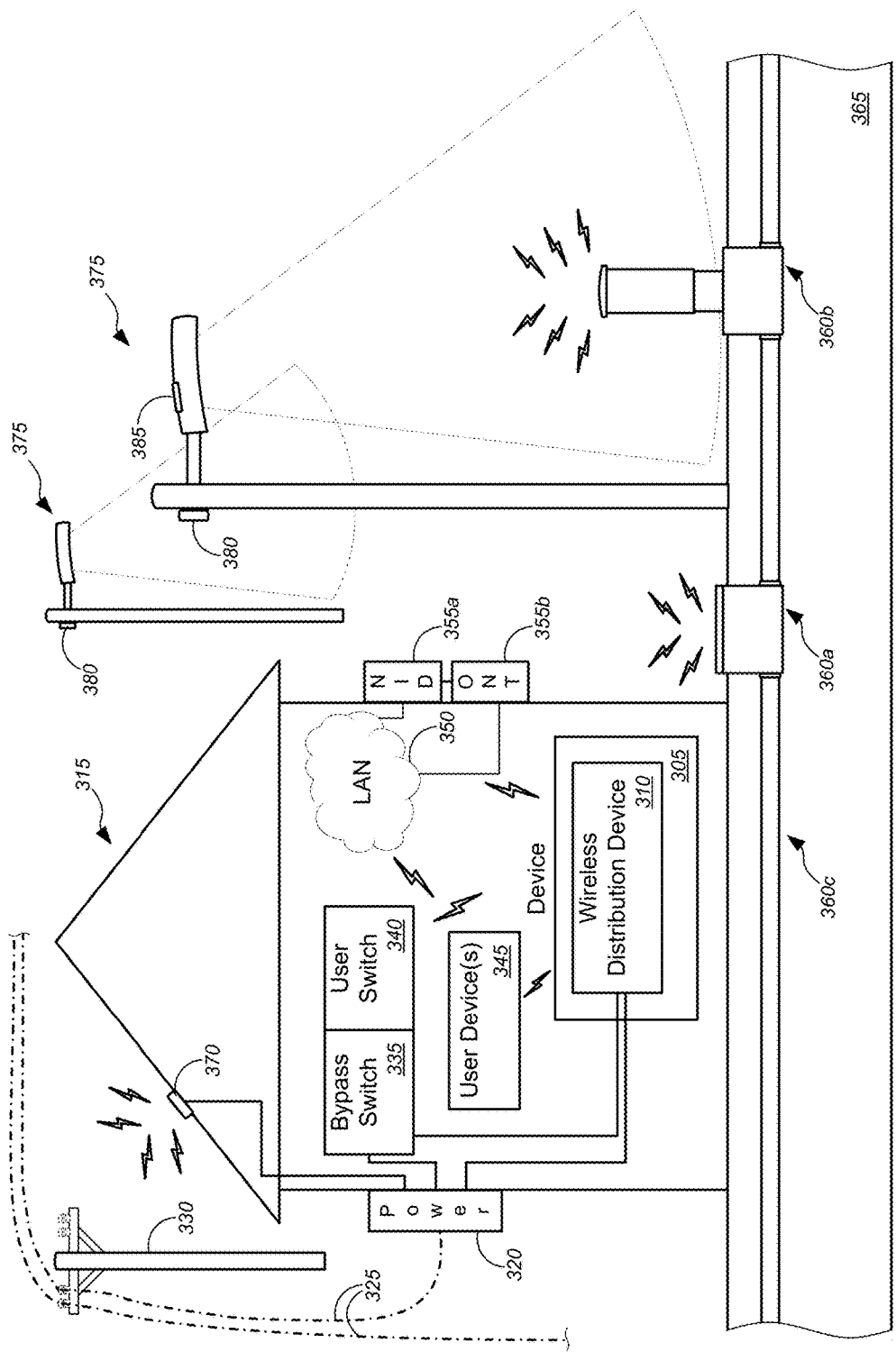
FIG. 3 is a schematic diagram illustrating another system for implementing distributed broadband wireless implementation in premises electrical devices, in accordance with various embodiments.

FIG. 3 is a schematic diagram illustrating another system 300 for implementing distributed broadband wireless implementation in premises electrical devices, in accordance with various embodiments. System 300 might comprise a device (s) 305 and a wireless distribution device 310 disposed in (each of) the device(s) 305 (which might include extending from an inner portion to an outer portion of the device 305, or might include being disposed on or otherwise affixed to an external portion of the device 305, or the like). The device(s) 305 might be disposed within customer premises 315 (either indoors (as shown) or in a front, side, or back yard of the customer premises 315 (not shown)). In some cases, the device(s) 305 might be disposed outside of the property line of the customer premises 315, but near the customer premises 315 (at least within wireless communications range), such as in/on lamp post(s) 375 or the like. System 300 might further comprise a power relay system 320 (e.g., breaker box or the like), which might be disposed on a wall of (a building; e.g., an exterior wall of the building of) the customer premises 315, that relays power over one or more power lines 325 (which might be relayed near the customer premises via one or more utility poles 330 or via one or more underground power distribution systems (not shown), or the like).

System 300 might further comprise a bypass switch 335 and a user switch 340 (e.g., wall switch or the like) that are both communicatively coupled via power line to device 305. System 300 might further comprise one or more user devices 345, a local area network ("LAN") 350, a network interface device ("NID") 355a and/or an optical network terminal ("ONT") 355b, one or more ground-based signal distribution devices 360a or 360b (which might include, without limitation, one or more hand holes 360a, one or more flowerpot hand holes (not shown), one or more pedestal platforms 360b, one or more network access point ("NAP") platforms (not shown), one or more fiber distribution hub ("FDH") platforms (not shown), and/or the like that are described in greater detail in the '665 and '676 applications, which have already been incorporated herein by reference in their entirety). Each of these ground-based signal distribution devices may be used to transmit and receive (either wirelessly or via wired connection) data, voice, video, and/or power signals to and from one or more utility poles, one or more customer premises, and/or one or more mobile user devices, apical conduit systems (as described in detail in the '470, '460, '458, '243, '851, '574, '676, '665, '754, '488, and '023 applications, which have already been incorporated herein by reference in their entirety), or the like. The one or more ground-based signal distribution devices 360a or 360b might communicatively couple with a central office or other service provider facility, or the like, via one or more lines (including, but not limited to, copper signal lines, fiber optic lines, power lines, and/or the like) that are routed through one or more conduits 360c, which (like at least the containers of the one or more ground-based signal distribution devices 360a or 360b) might be buried in ground 365 (i.e., with a top portion substantially level with a ground surface of ground 365 or buried below the ground surface of ground 365, or the like). Antennas or other wireless transceivers in the lid, within the container, and/or within the pedestal portion of the one or more ground-based signal distribution devices 360a or 360b might wirelessly relay, via the conduit 360c, communications (i.e., data, voice, video, and/or power signal communications, or the like) via the one or more lines that are routed through the conduits 360c from/to the central office (or other service provider facility) to/from at least one of the NID 355a, the ONT 355b, the wireless distribution device 310, the one or more user devices 345, and/or the like.

Similar to the embodiment of system 100 of FIG. 1, the bypass switch 335, in conjunction with a switching device (which might correspond to switching device 115 of system 100 of FIG. 1 or switching device 215 of FIG. 2, or the like), might be configured to provide constant power from the power relay system 320 to a wireless transceiver (which might correspond to wireless transceiver 120 of system 100 of FIG. 1 or wireless transceiver 220 of FIG. 2, or the like). The wireless transceiver might relay the wireless communications to the LAN 350 and/or to devices (e.g., user devices 345 or the like) that are communicatively coupled to the LAN 350. The LAN 350, in some cases, might also communicatively couple to the one or more ground-based signal distribution devices 360a or 360b via NID 355a and/or ONT 355b, or might communicatively couple to one or more other Internet (or other network) sources via NID 355a and/or ONT 355b, or the like. In some instances, the user device(s) 345 might each include, but is not limited to, one of a tablet computer, a desktop computer, a laptop computer, a smart phone, a mobile phone, a portable gaming device, a remote control device, or a personal digital assistant, and/or the like.

Meanwhile, as also described in the embodiment of system 100 of FIG. 1, the bypass switch 355 might receive user input via the user switch 340 (the user input indicating one of turning the device 305 on, turning the device 305 off, or changing an operational mode of device 305, or the like), might send a signal (via power line signal over the power line between the bypass switch 335 and the switching device of the wireless distribution device 310 or via wireless communication that is established between the bypass switch 335 and the switching device of the wireless distribution device 310, or the like) to the switching device of the wireless distribution device 310 to switchably supply power to the device 305 based at least in part on the user input, the supplied power enabling the device 305 to perform its designed functionalities. According to some embodiments, the bypass switch 355 might receive such user input from at least one user device 345 (either directly via wireless communication, rather than from the user switch 340, or indirectly via user switch 340, which might be wirelessly communicating with the at least one user device 345, or the like), and might relay such user input in a similar manner to the switching device. Alternatively, the at least one user device 345 might directly send the user input to the switching device of the wireless distribution device 310, without sending either through the bypass switch 335 or through user switch 340.

In some cases, the device 305 might include, without limitation, one of a landscape light, a porch light, a patio light, a garage light, an indoor room light, an indoor lamp, a night light, a fan, a security camera, a security alarm, a sensor device, a motion detector, or an electrical outlet, and/or the like, and its designed functionalities might correspondingly include, without limitation, one of illuminating landscape features, illuminating a porch area, illuminating a patio area, illuminating a garage and/or driveway, illuminating a room, illuminating an area of a room, illuminating a room or hallway, providing air circulation or ventilation, providing security video capture capabilities, sounding an alarm when activated, sensing environmental or other conditions or states, detecting motion of people, animals, or objects, providing electrical power to wired devices, and/or the like, respectively.

In some embodiments, system 300 might further comprise a device 370 that might be a roof-mounted wireless distribution device. In some instances, the device 370 might be mounted on one of a roof-top, a venting pipe, a roof-protruding pipe, a side wall of a building, a louvered side panel, or a vented side panel, and/or the like. In some cases, device 370 might be a dedicated transceiver device without other device functionality, while, in other cases, device 370 might comprise one or more of a lighting system, a camera system, a motion detection system, a solar cell array system, a solar light detection system, a weather station, a weather sensor system, and/or the like. The device 370 might relay communications from/to at least one of the wireless distribution device 310, the user device(s) 345, the one or more ground-based signal distribution devices 360*a* or 360*b*, one or more other service provider nodes, wireless distribution devices 380 that might be disposed in/on lamp posts 375 (which, in some cases, might be solar powered via solar array 385 or might turn on or off via solar sensor 385 when it is dark or light, respectively), and/or the like. According to some embodiments, the device 370 might relay communications to devices, user devices, or wireless distribution devices, and/or the like, that are disposed in another nearby or adjacent customer premises. In some cases, the wireless distribution device 310 might relay communications to devices, user devices, or wireless distribution devices, and/or the like, that are disposed in another nearby or adjacent customer premises, without relaying through device 370 (which in some cases, might not be available or might not be installed).

The device 305, the wireless distribution device 310, the power relay system 320, the bypass switch 335, the user switch 340, the user device(s) 345, the one or more ground-based signal distribution devices 360*a* or 360*b*, and the device 370 or the lamp post(s) 375 of system 300 of FIG. 3 are otherwise similar, if not identical, to the devices 105, the wireless distribution devices 110 or 175, power supply 125, the bypass switches 165, the user switches 160, the user devices 180, the service node or base 130, and the devices 170 of system 100 of FIG. 1, respectively, and the descriptions of these components in FIG. 1 apply similarly to the corresponding components in FIG. 3.

Figure 4A:
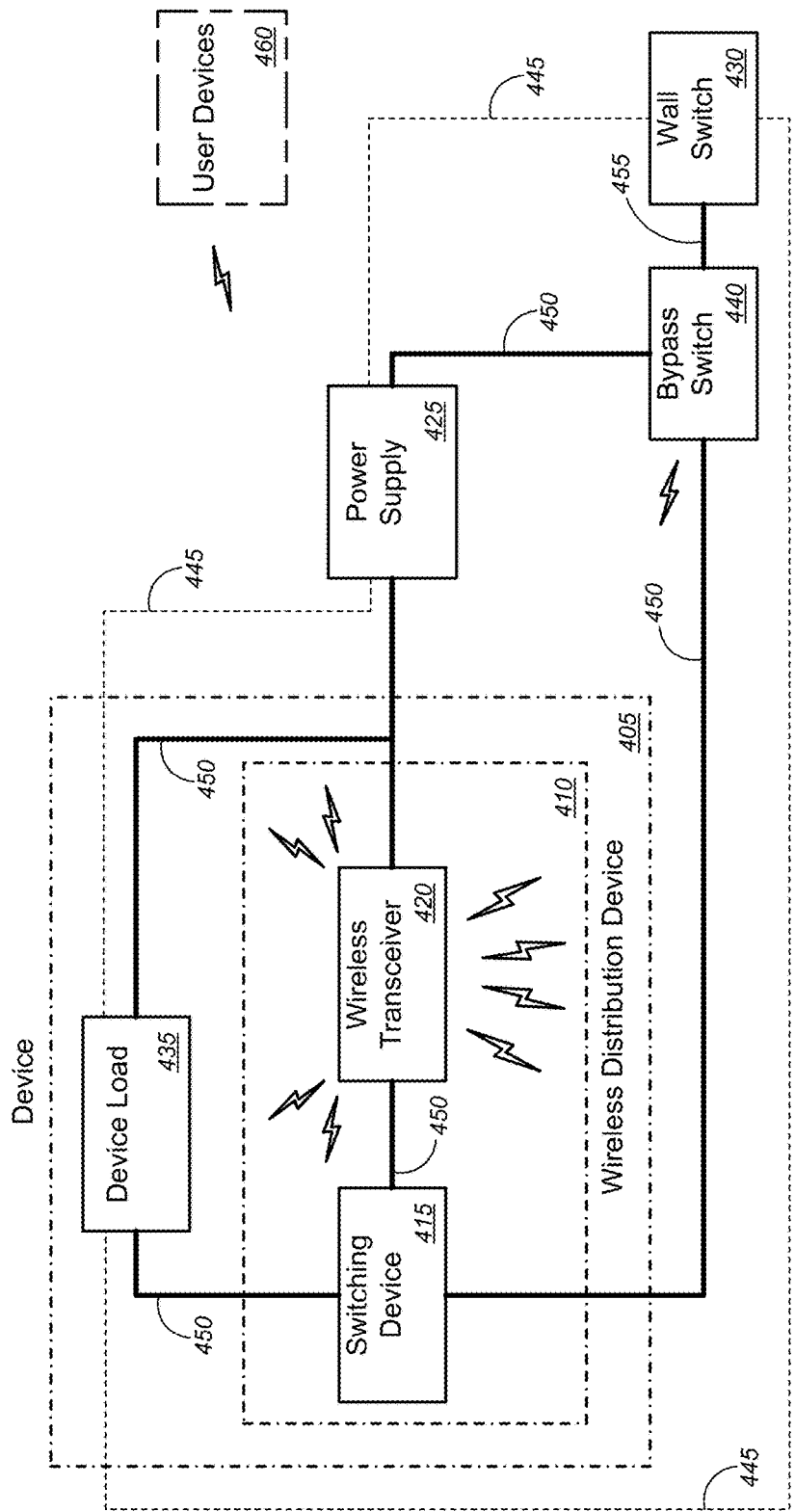
FIGS. 4A-4D are schematic diagrams illustrating various systems for implementing distributed broadband wireless implementation in premises electrical devices, in accordance with various embodiments.
Figure 4B:
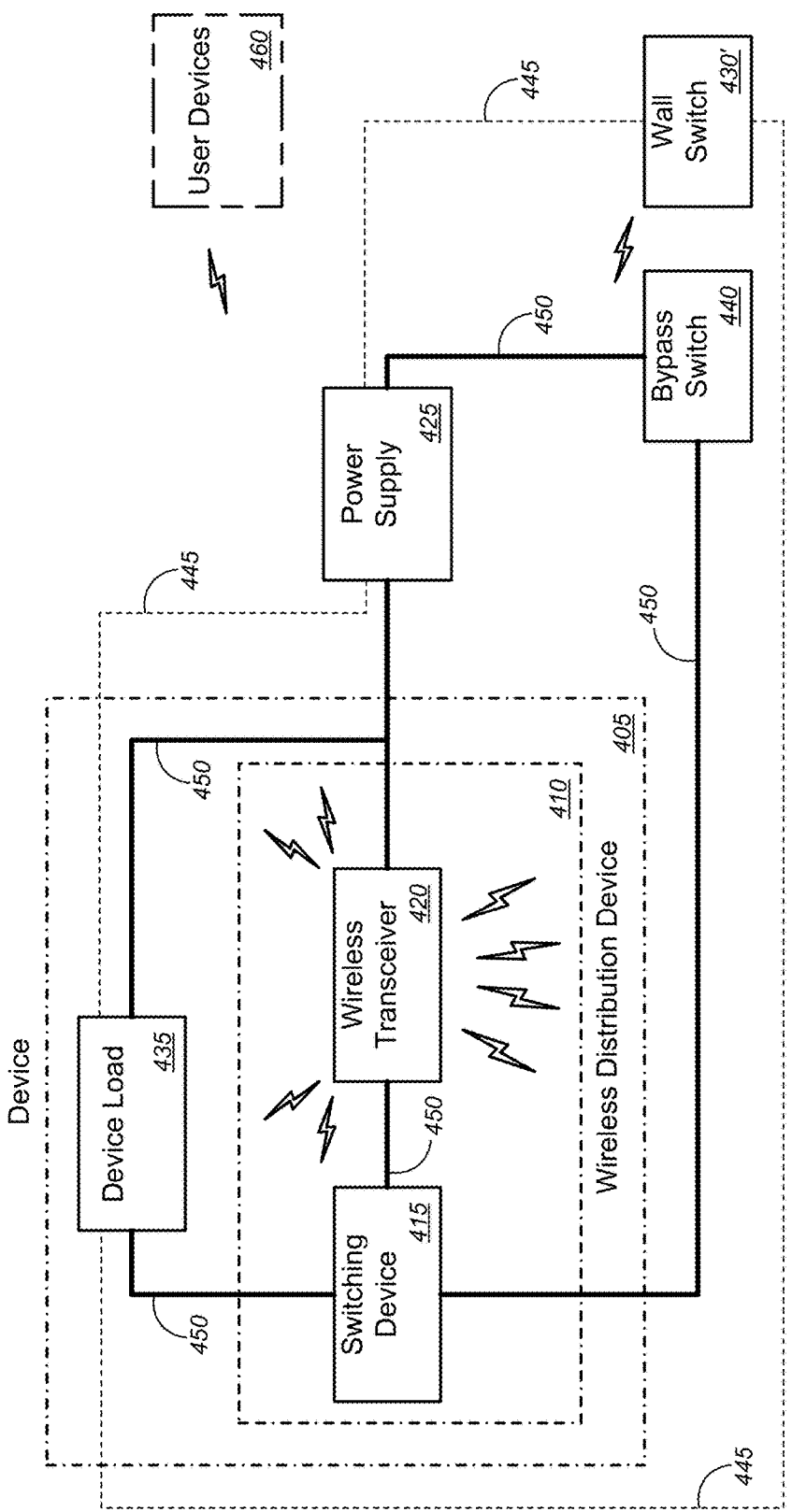
Figure 4C:
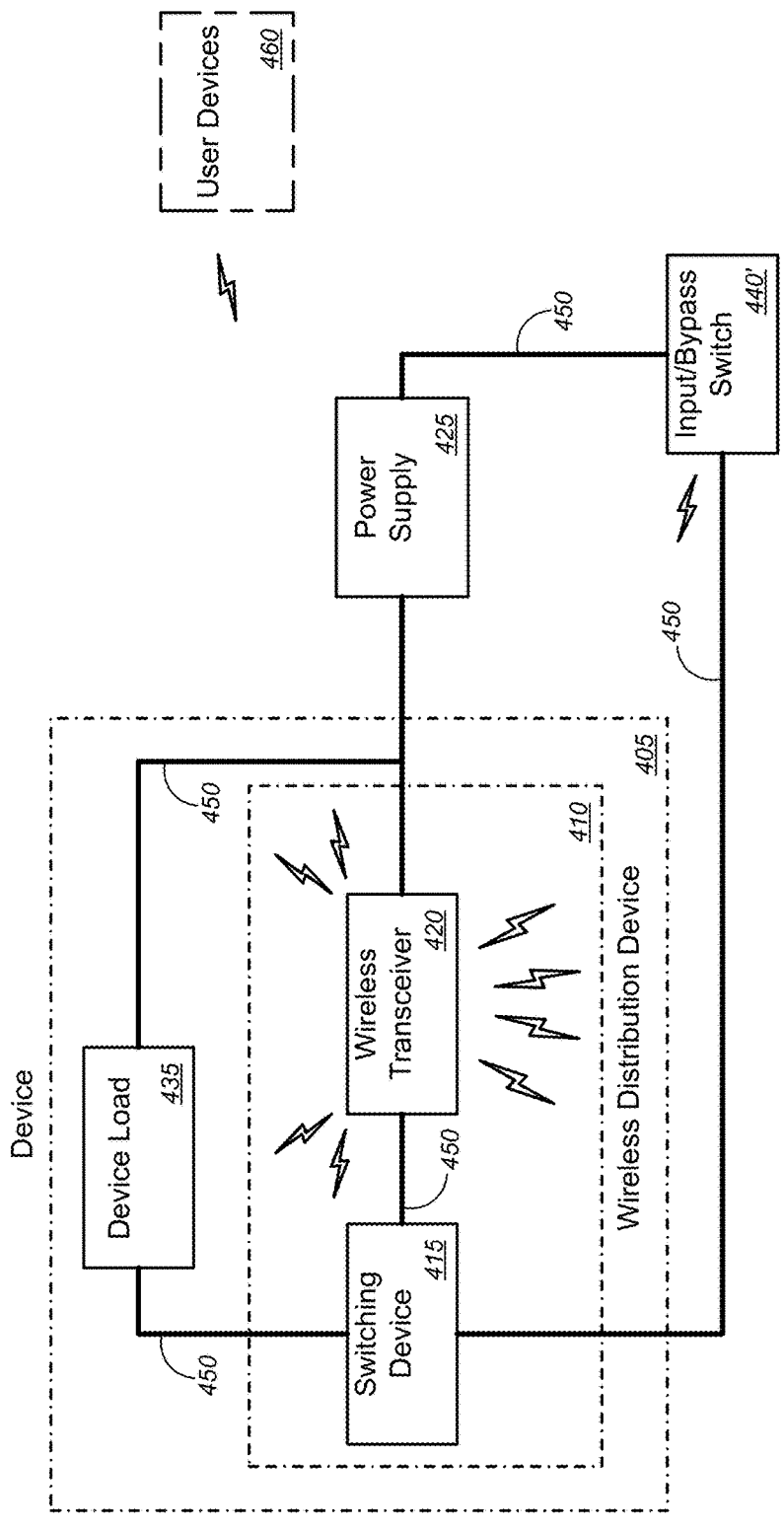
Figure 4D:
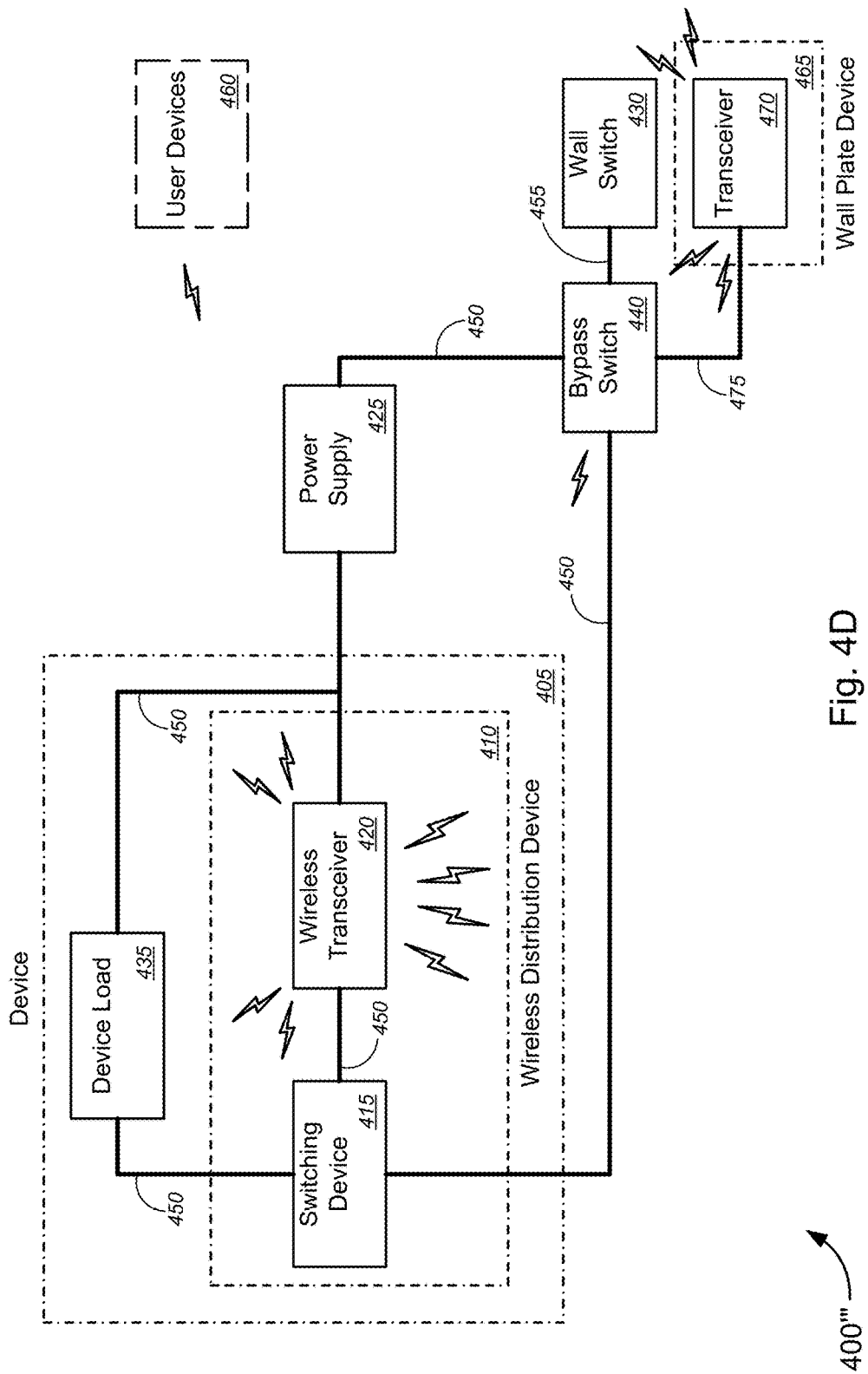

FIGS. 4A-4D (collectively, "FIG. 4") are schematic diagrams illustrating various systems 400, 400', 400", and 400''' for implementing distributed broadband wireless implementation in premises electrical devices, in accordance with various embodiments. FIG. 4A depicts an embodiment in which a wireless distribution device and a bypass switch replace the functionality of a wall switch while receiving input from the wall switch via wired connection, while FIG. 4B depicts an embodiment that is similar to that of FIG. 4A except that the bypass switch and/or the wireless distribution device receive input from the wall switch via wireless connection, FIG. 4C depicts an embodiment in which the bypass switch of FIGS. 4A and 4B replace not only the functionalities of the wall switch but also the physical space of the wall switch in the form of a combination switch, and FIG. 4D depicts an embodiment that is similar, if not identical, to that of FIG. 4A (and, in some cases, might be similar, if not identical, to that of FIG. 4B (not shown)) except that a wall plate device with a transceiver is used to serve as an additional wireless communications relay into the customer premises and to the LAN within the customer premises. In general, the particular configurations of components in FIG. 4 are merely intended to be illustrative, and in no way limit the various embodiments to the particular configurations shown. In fact, any suitable configuration of the various components may be used without departing from the scope of the various embodiments, so long as one or more switches supplies constant power from a power supply to a wireless transceiver that relays wireless communications, while switchably supplying power from the power supply to a device load of a device.

With reference to the non-limiting embodiment of FIG. 4A, system 400 might comprise a device 405 (which is depicted in FIG. 4 by the dash-dot block), a wireless distribution device 410 (which is depicted in FIG. 4 by the dash-dash-dot block), a switching device 415, a wireless transceiver 420, a power supply 425, a wall switch 430, a device load 435, and bypass switch 440. The device 410 (which might correspond to devices 105*a*-105*n*, 170*a*-170*n*, 305, and 375, of FIGS. 1 and 3, or the like) might include, without limitation, one of a lamp post light, a landscape light, a porch light, a patio light, a garage light, an indoor room light, an indoor lamp, a night light, a fan, a security camera, a security alarm, a sensor device, a motion detector, or an electrical outlet, and/or the like. The wireless distribution device 410 (which might correspond to wireless distribution devices 110*a*-110*b*, 175*a*-175*n*, 210, 210', 310, 370, and 380 of FIG. 1-3, or the like) might be disposed within or on the device 405 (which might include the wireless distribution device 410 extending from an inner portion to an outer portion of the device 405, or to the wireless distribution device 410 being disposed on or otherwise affixed to an external portion of the device 405, or the like). The wireless distribution device 410 might comprise the switching device 415 (which might correspond to switching devices 115*a*-115*n* and 215 of FIGS. 1 and 2, or the like) and the wireless transceiver 420 (which might correspond to wireless transceivers 120*a*-120*n* and 220 of FIGS. 1 and 2, or the like).

Before the functionalities of the wall switch 430 are replaced by the wireless distribution device 410 and the bypass switch 440, the power supply 425 might form an electrical circuit with the wall switch 430 and the device load 435 of the device, as depicted by the small dash line 445 connecting these three components together. When the wall switch 430 is in the closed position (e.g., when the user interacts with the wall switch 430 intending to turn the device 405 on), electrical power would flow from the power supply 425 through the closed wall switch 430 to the device load 435 and back to the power supply 425, thereby providing electrical power to the device load 435 and allowing it to perform its intended functionalities. For example, if the device 405 is a lighting system and the device load 435 is a bulb, the power supplied to the device load 435 would enable the device load 435 (in this case, the bulb) to light up, thus illuminating the area around the bulb. When the wall switch 430 is in the opened position (e.g., when the user interacts with the wall switch 430 intending to turn the device 405 off), electrical power would cease to flow from the power supply 425 to the device load 435 due to the open circuit at wall switch 430. Without power being fed to it, the device load 435 would stop (or continue to not) perform its intended functionalities. For example, in the lighting system example above, when the wall switch 430 is in the off (or open circuit) state, the power from the power supply 425 is prevented from flowing to the device load 435 (in this case, the bulb), thus preventing the bulb from turning on and illuminating the surrounding area.

After the functionalities of the wall switch 430 have been replaced by the wireless distribution device 410 and the bypass switch 440 (e.g., by rewiring the circuit illustrated by line 445 with the circuit illustrated by line 450), however, the power supply 425 might form an electrical circuit with the bypass switch 440, the switching device 415, and the wireless transceiver 420 along a first circuit loop, while forming an electrical circuit with the bypass switch 440, the switching device 415, and the device load 435 along a second circuit loop, as depicted by the solid bold line 450 connecting these five components of system 400 together. The bypass switch 440, in some cases in conjunction with the switching device 415 (while in other cases, the switching device 415 might be disposed along the second circuit loop and not along the first circuit loop (not shown)), might ensure a permanent (or constant) closed circuit loop along the first circuit loop, such that electrical power would constantly flow from the power supply 425 through the bypass switch 440, through the switching device 415 (in the embodiments as shown in FIG. 4; although in other embodiments, in which the switching device 415 is disposed along the second circuit loop (not shown), the electrical power would not flow through the switching device 415 when powering the wireless transceiver 420), to the wireless transceiver 420 and back to the power supply 425, thereby providing (constant) electrical power to the wireless transceiver 420 and allowing the wireless transceiver 420 to be able to (constantly or at any time) relay any wireless communications from/to a service provider node and/or from/to another wireless source to/from one or more LAN devices and/or to/from one or more user devices, or the like.

When the wall switch 430 is in the closed position (e.g., when the user interacts with the wall switch 430 intending to turn the device 405 on), the wall switch 430 might send, via power line signal or via a dedicated wired connection signal via wire line 455, a signal indicating to turn on the device 405. The bypass switch 440 might then send a signal to the switching device 415 (either via power line signal along power line 450 or via wireless communication as depicted by the lightning bolt symbol) indicating to turn on the device 405. Based on a determination by the switching device 415 that the switch to the second circuit loop is already closed, the switching device 415 might maintain the second circuit loop in the closed state, thereby continuing to allow electrical power to flow to the device load 435. On the other hand, based on a determination by the switching device 415 that the switch to the second circuit loop is currently in the open state, the switching device 415 might close the switch to the second circuit loop, thereby allowing electrical power to flow to the device load 435. In the lighting system example above, the bulb would be turned on, or would continue to be in the on state, thereby illuminating the area around the bulb. In some embodiments, no determination per se is made by the switching device 415; rather, the "on" signal from the bypass switch 440 causes the switching device 415 to close the switch to the second circuit loop (or causes the switching device 415 to maintain the switch in a closed state).

When the wall switch 430 is in the opened position (e.g., when the user interacts with the wall switch 430 intending to turn the device 405 off), the wall switch 430 might send, via power line signal or via a dedicated wired connection signal via wire line 455, a signal indicating to turn off the device 405. The bypass switch 440 might then send a signal to the switching device 415 (either via power line signal along power line 450 or via wireless communication as depicted by the lightning bolt symbol) indicating to turn off the device 405. Based on a determination by the switching device 415 that the switch to the second circuit loop is already opened, the switching device 415 might maintain the second circuit loop in the opened state, thereby continuing to prevent electrical power from flowing to the device load 435. On the other hand, based on a determination by the switching device 415 that the switch to the second circuit loop is currently in the closed state, the switching device 415 might open the switch to the second circuit loop, thereby preventing electrical power from flowing to the device load 435. In the lighting system example above, the bulb would be turned off, or would continue to be in the off state, thus preventing the bulb from turning on and illuminating the surrounding area. In some embodiments, no determination per se is made by the switching device 415; rather, the "off" signal from the bypass switch 440 causes the switching device 415 to open the switch to the second circuit loop (or causes the switching device 415 to maintain the switch in a opened state).

According to some embodiments, although not shown herein, the bypass switch 440 might comprise a power source (which might be a battery that is either replaceable or rechargeable by the power supply 425, or which might be a power line connected to the power supply 425 itself) and a signal generator (either a power line signal generator and/or a wireless communication signal generator). The power source, the wall switch 430, and the signal generator might form a signaling circuit. When the wall switch 430 is in the closed position (e.g., when the user interacts with the wall switch 430 intending to turn the device 405 on), the signaling circuit might be closed, thereby supplying power from the power source of the bypass switch 440 through the closed wall switch 430 to the signal generator, which would then send the power line signal or the wireless communications signal to the switching device 415 to turn the device 405 on, by closing the switch to the second circuit loop and supplying power to the device load 435. Similarly, when the wall switch 430 is in the opened position (e.g., when the user interacts with the wall switch 430 intending to turn the device 405 off), the signaling circuit might be opened, thereby preventing power from flowing from the power source of the bypass switch 440 to the signal generator due to the open circuit at wall switch 430, which would then prevent power from flowing the signal generator, which by its lack of power might itself signal to the switching device 415 to turn the device 405 off, by opening the switch to the second circuit loop and supplying power to the device load 435.

Alternatively, the signal generator might be constantly supplied with power from the power supply 425, and a small signal generator might form a signaling circuit with the power source and the wall switch 430. When the wall switch 430 is in the closed position (e.g., when the user interacts with the wall switch 430 intending to turn the device 405 on), the signaling circuit might be closed, thereby supplying power from the power source of the bypass switch 440 through the closed wall switch 430 to the small signal generator, which would then send an "on" signal to an input of the signal generator that in turn sends the power line signal or the wireless communications signal to the switching device 415 to turn the device 405 on, by closing the switch to the second circuit loop and supplying power to the device load 435. Similarly, when the wall switch 430 is in the opened position (e.g., when the user interacts with the wall switch 430 intending to turn the device 405 off), the signaling circuit might be opened, thereby preventing power from flowing from the power source of the bypass switch 440 to the small signal generator due to the open circuit at wall switch 430, which would then prevent power from flowing the small signal generator, which by its lack of power might itself signal an "off" signal to the input of the signal generator, which would then in turn send a power line signal or wireless communications signal to the switching device 415 to turn the device 405 off, by opening the switch to the second circuit loop and supplying power to the device load 435.

According to some embodiments, alternative or additional to using the wall switch 430 to control the powered state of the device 405, one or more user devices 460 (optional; which might correspond to user devices 180 and 345 of FIGS. 1 and 3, or the like) might be used to send "on" or "off" wireless communications signals directly to the switching device 415 to turn the device 405 on or off, respectively, in a manner similar to the bypass switch 440 sending wireless communications signals to the switching device 415 to turn the device 405 on or off. In some cases, the user devices 460 might include, but are not limited to, one of a tablet computer, a desktop computer, a laptop computer, a smart phone, a mobile phone, a portable gaming device, a remote control device, or a personal digital assistant, and/or the like.

In some embodiments, in addition to simply turning on or off the device 405, the wall switch 430 and/or the one or more user devices 460 might comprise additional options for setting or changing the mode of operation of the device 405. In the lighting system example above, for instance, the additional options might, but are not limited to, include two or more levels (or a sliding range of levels) of illumination (as in a dimmer switch), timer settings (e.g., on times, off times, duration at each on time, days of week, etc.), and/or the like. For fans, the additional options might include, without limitation, two or more levels (or a sliding range of levels) of blower capacity (or the amount of air volume over a set period (e.g., cfm value or range, etc.), timer settings (e.g., on times, off times, duration at each on time, days of week, etc.), and/or the like. For cameras, the additional options might include, but are not limited to, tracking options for pan/tilt/zoom controls, video storage options, timer settings (e.g., on times, off times, duration at each on time, days of week, etc.), and/or the like. For alarms, the additional options might include, without limitation, alarms sounds and duration, trigger options, and/or the like. For sensor devices and motion detectors, the additional options might include, but are not limited to, trigger options, action options when triggered, timer settings (e.g., on times, off times, duration at each on time, days of week, always on, etc.), and/or the like. For electrical outlets, the additional options might include, without limitation, alerts for when the load is approaching load capacity, timer settings (e.g., on times, off times, duration at each on time, days of week, etc.), and/or the like. And so on.

Merely by way of example, according to some embodiments, the device 405 might be a lighting system and the wireless distribution device 405 might comprise, or might be in the form of, a bulb socket that comprises the switching device 415 and the wireless transceiver 420. The device load 435 might comprise a conventional bulb (including, but not limited to, a compact fluorescent ("CFL") bulb, a light emitting diode ("LED") bulb, an incandescent bulb, a fluorescent bulb, a halogen bulb, and/or the like) might fit into the bulb socket. The wireless distribution device 405 (as well as the switching device 415 and the wireless transceiver 420) might otherwise function in the manner as described above. Alternatively, the wireless distribution device 405 might comprise a smart bulb (which might have the lighting functionalities of one of the CFL bulb, the LED bulb, the incandescent bulb, the fluorescent bulb, the halogen bulb, or the like). The smart bulb would comprise the switching device 415 and the wireless transceiver 420, as well as the device load 435. The smart bulb might otherwise function in the manner as described above with respect to the switching device 415, the wireless transceiver 420, and the device load 435.

The device 405, the wireless distribution device 410, the switching device 415, the wireless transceiver 420, the power supply 425, the bypass switch 440, the wall switch 430, and the user device(s) 460 of system 300 of FIG. 3 are otherwise similar, if not identical, to the devices 105, the wireless distribution devices 110 or 175, the switching devices 115, the wireless transceivers 120, the power supply 125, the bypass switches 165, the user switches 160, and the user devices 180 of system 100 of FIG. 1, respectively, and the descriptions of these components in FIG. 1 apply similarly to the corresponding components in FIG. 4.

Turning to FIG. 4B, the non-limiting embodiment of system 400' is similar, if not identical, to that of system 400 of FIG. 4A, except that the wall switch 430' is not physically connected to bypass switch 440 (i.e., not connected via line 455 or the like, as shown in FIG. 4A). Rather, wall switch 430' is either replaced with a combination wall switch/signaling device (similar to the signaling circuit described above) or wall switch 430' comprises the wall switch 430 of FIG. 4A and a signal device (which is similar to the signal circuit described above). In the former case, the wall switch 430 of FIG. 4A is replaced by a single unit that serves the function of user input while serving the function of signaling circuit. In the latter case, the wall switch 430 remains on the wall, while a signaling device is communicatively coupled to the wall switch 430 to form a signaling circuit. System 400' of FIG. 4B would otherwise function in a similar, if not identical, manner as system 400, and the description of the components of system 400 would otherwise apply similarly to the corresponding components of system 400' of FIG. 4B.

With reference to FIG. 4C, the non-limiting embodiment of system 400" is similar, if not identical, to that of system 400 of FIG. 4A and system 400' of FIG. 4B, except that the bypass switch 440 and the wall switch 430 or 430' are replaced by a combination wall switch/bypass switch 440' (also referred to as "combination switch 440" or the like). In other words, from the perspective of the user, the combination switch 440' might look similar or identical to the wall switch 430. The combination switch 440' might, however, comprise circuitry that allows constant power to be supplied to the wireless transceiver 420, while signaling the switching device 415 to switchably supply power to the device load 435, in accordance to one or more of the embodiments as described above in reference to system 400 of FIG. 4A with respect to the bypass switch 440 and the wall switch 430, except that the functionalities and components of the bypass switch 440 and the wall switch 430 are embodied in a single device in the form of combination switch 440'. System 400" of FIG. 4C would otherwise function in a similar, if not identical, manner as system 400, and the description of the components of system 400 would otherwise apply similarly to the corresponding components of system 400″ of FIG. 4C.

Turning to FIG. 4D, the non-limiting embodiment of system 400‴ is similar, if not identical, to that of system 400 of FIG. 4A (or system 400′ of FIG. 4B, although this is not shown in FIG. 4D), except that system 400‴ might further comprise a wall plate device 465 (which might be disposed near the wall switch 430 or might be disposed in a different part of the interior of the customer premises). The wall plate device 465 might comprise a transceiver 470, which might relay communications from the wireless transceiver 420 either via wireless communications established between the transceiver 470 and the wireless transceiver 420 or via broadband-over-power communications via power line 450 and line 470 (from wireless transceiver 420, through switching device 415 (except for embodiments in which the switching device 415 is disposed along the second circuit loop (not shown), and through the bypass switch 440). In this manner, transceiver 470 can directly relay communications from the wireless transceiver 420 directly into the customer premises to connect with the LAN in the customer premises or to one or more devices that are connected to the LAN in the customer premises, or the like. System 400‴ of FIG. 4D would otherwise function in a similar, if not identical, manner as system 400, and the description of the components of system 400 would otherwise apply similarly to the corresponding components of system 400‴ of FIG. 4D.

Figure 5:
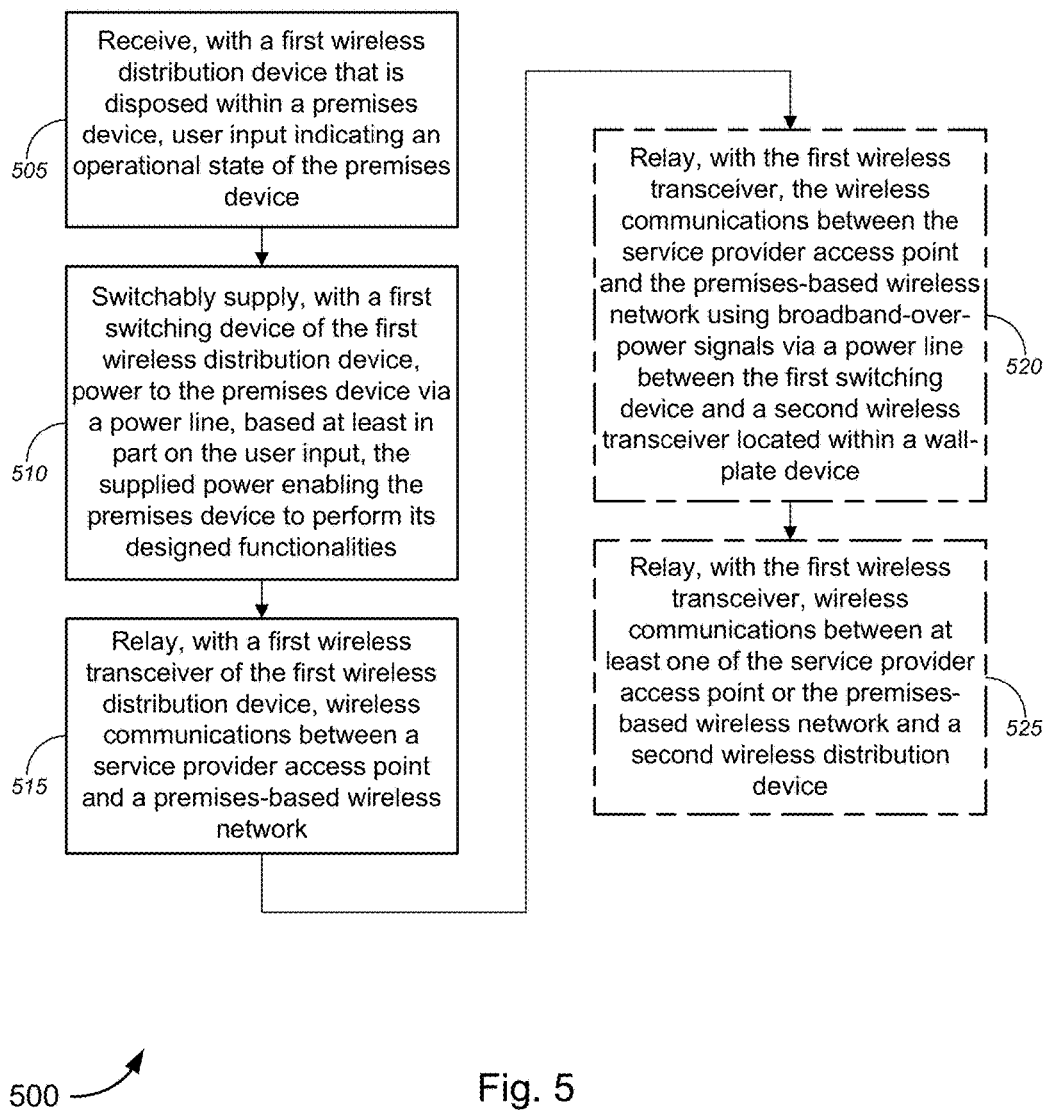
FIG. 5 is a flow diagram illustrating a method for implementing distributed broadband wireless implementation in premises electrical devices, in accordance with various embodiments.

FIG. 5 is a flow diagram illustrating a method 500 for implementing distributed broadband wireless implementation in premises electrical devices, in accordance with various embodiments.

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems or apparatuses 100, 200 or 200′, 300, and 400-400‴ of FIGS. 1, 2, 3, and 4, respectively (or components thereof), such methods may also be implemented using any suitable hardware (or software) implementation. Similarly, while each of the systems or apparatuses 100, 200 or 200′, 300, and 400-400‴ of FIGS. 1, 2, 3, and 4, respectively (or components thereof), can operate according to the method 500 illustrated by FIG. 5 (e.g., by executing instructions embodied on a computer readable medium), the systems or apparatuses 100, 200 or 200′, 300, and 400-400‴ of FIGS. 1, 2, 3, and 4 can each also operate according to other modes of operation and/or perform other suitable procedures.

In the non-limiting embodiment of FIG. 5, method 500, at block 505, might comprise receiving, with a first wireless distribution device (which might correspond to wireless distribution devices 110*a*-110*b*, 175*a*-175*n*, 210, 210′, 310, 370, and 380, and 410 of FIGS. 1-4, or the like) that is disposed within a premises device (which might include extending from an inner portion to an outer portion of the premises device, or being disposed on or otherwise affixed to an external portion of the premises device, or the like), user input indicating an operational state of the premises device (i.e., user input indicating to turn the premises device on, user input indicating to turn the premises device off, user input indicating to change an operational mode of the premises device, and/or the like). Merely by way of example, in some cases, the premises device might include, without limitation, one of a lamp post light, a landscape light, a porch light, a patio light, a garage light, an indoor room light, an indoor lamp, a night light, a fan, a security camera, a security alarm, a sensor device, a motion detector, or an electrical outlet, and/or the like. In some embodiments, the first switching device might comprise a smart switch that allows the power that is supplied to the premises device to be switched on or off while maintaining constant power to the first wireless transceiver. In some cases, the first switching device (or the smart switch) might be remotely controllable via at least one of the power line using a power-line signal (from a wall-mounted user-actuated switch or the like) or a wireless communication link established between a user device (which might correspond to user devices 180, 345, and 460 of FIGS. 1, 3, and 4, or the like) and the first switching device (or the smart switch). In some instances, the user device might include, but is not limited to, one of a tablet computer, a desktop computer, a laptop computer, a smart phone, a mobile phone, a portable gaming device, a remote control device, or a personal digital assistant, and/or the like.

At block 510, method 500 might comprise switchably supplying, with a first switching device (which might correspond to switching devices 115*a*-115*n*, 215, and 415 of FIGS. 1, 2, and 4, or the like) of the first wireless distribution device that is disposed within the premises device (which might correspond to devices 105*a*-105*n*, 170*a*-170*n*, 305, 375, and 405 of FIGS. 1, 3, and 4, or the like), power to the premises device via a power line, based at least in part on the user input, the supplied power enabling the premises device to perform its designed functionalities. For example, for user inputs indicating to turn the premises device on or to set an operational mode of the premises device when the device is in the off state, the first switching device might close the circuit to supply the power from a power source to the premises device. For user input indicating to turn the premises device off when the device is in the on state, the first switching device might open the circuit to cut the supply of power from the power source to the premises device. For user input indicating to change the operational mode of the premises device when the premises device is already in the on state, the first switching device might maintain the circuit in the closed state to continue supplying the power from the power source to the premises device.

Method 500 might further comprise relaying, with a first wireless transceiver (which might correspond to wireless transceivers 120*a*-120*n*, 220, and 420 of FIGS. 1, 2, and 4, or the like) of the first wireless distribution device, wireless communications between a service provider access point (which might correspond to service node or base 130 and 360 of FIGS. 1 and 3 of FIGS. 1, 2, and 4, or the like) and a premises-based wireless network (which might correspond to LAN 350 of FIG. 3, or the like) (block 515). According to some embodiments, the first switching device (which might include a smart switch, or the like) might be communicatively coupled via the power line to a wall-plate device that controls the smart switch and that is located within a first customer premises, the wall-plate device might comprise a second wireless transceiver, and relaying the wireless communications between the service provider access point and the premises-based wireless network (at block 515) might comprise relaying, with the first wireless transceiver, the wireless communications between the service provider access point and the premises-based wireless network using broadband-over-power signals via the power line between the first switching device and the second wireless transceiver (at optional block 520).

In some cases, method 500 might further comprise, at optional block 525, relaying, with the first wireless transceiver, wireless communications between at least one of the service provider access point or the premises-based wireless network and a second wireless distribution device. In some cases, the second wireless distribution device might be located within a first customer premises within which the first wireless distribution device is located. Alternatively, the second wireless distribution device might be located within a second customer premises that is different from the first customer premises within which the first wireless distribution device is located. Alternatively, or additionally, the second wireless distribution device might be mounted on one of a roof-top, a venting pipe, a roof-protruding pipe, a side wall of a building, a louvered side panel, or a vented side panel, and/or the like.

Exemplary System and Hardware Implementation

Figure 6:
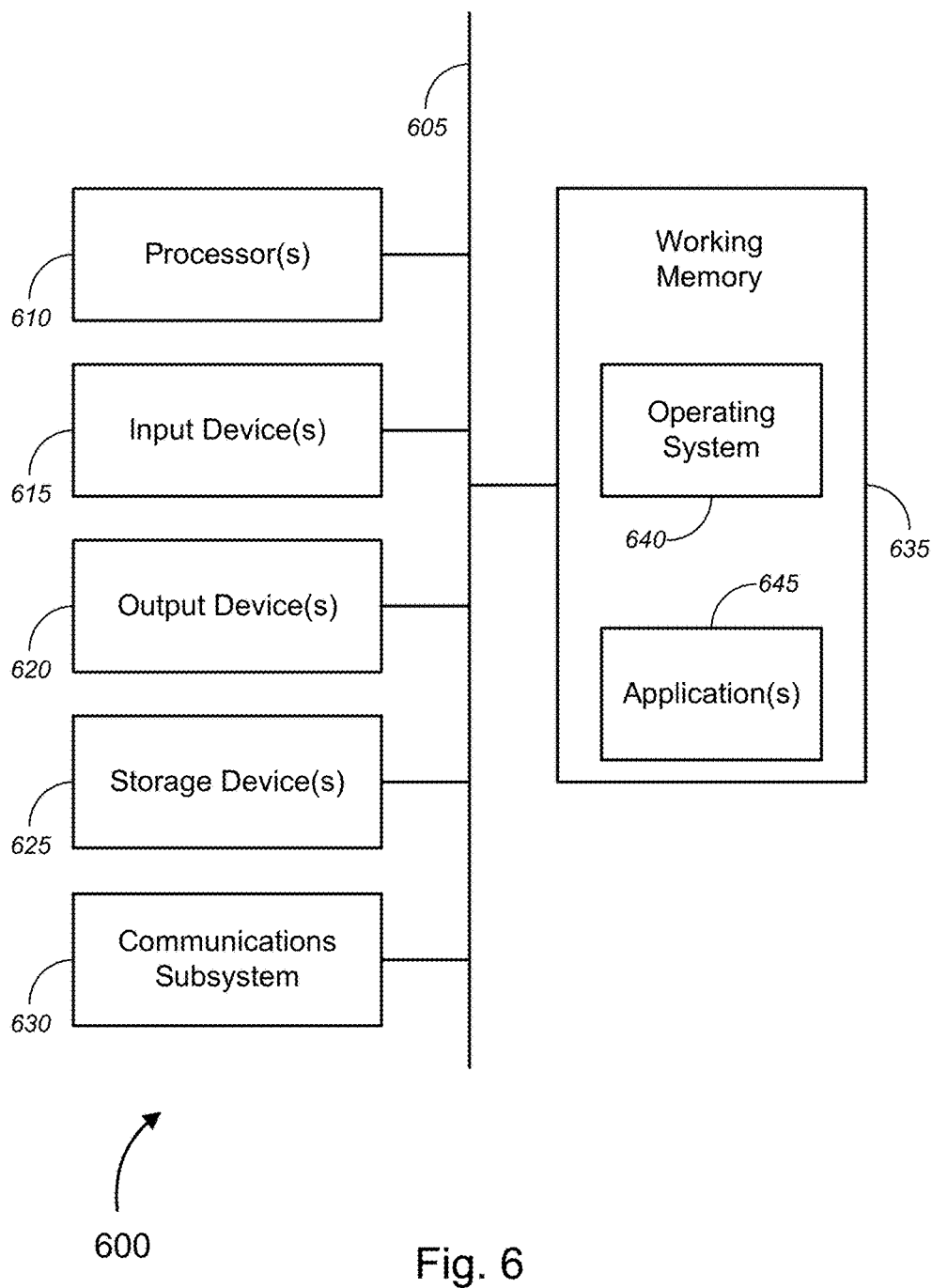
FIG. 6 is a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., devices 105a-105n, 170a-170n, 305, 375, and 405, wireless distribution devices 110a-110b, 175a-175n, 210, 210', 310, 370, and 380, and 410, switching devices 115a-115n, 215, and 415, wireless transceivers 120a-120n, 220, and 420, service node or base 130 and 360, server(s) 135, user switches 160a-160n, 340, and 430, bypass switches 165a-165n, 335, 440, and 440', user devices 180, 345, and 460, wall plate device 465, and transceiver 470, etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system (i.e., devices 105a-105n, 170a-170n, 305, 375, and 405, wireless distribution devices 110a-110b, 175a-175n, 210, 210', 310, 370, and 380, and 410, switching devices 115a-115n, 215, and 415, wireless transceivers 120a-120n, 220, and 420, service node or base 130 and 360, server(s) 135, user switches 160a-160n, 340, and 430, bypass switches 165a-165n, 335, 440, and 440', user devices 180, 345, and 460, wall plate device 465, and transceiver 470, etc.), described above with respect to FIGS. 1-5—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard and/or the like; and one or more output devices 620, which can include, without limitation, a display device, a printer, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
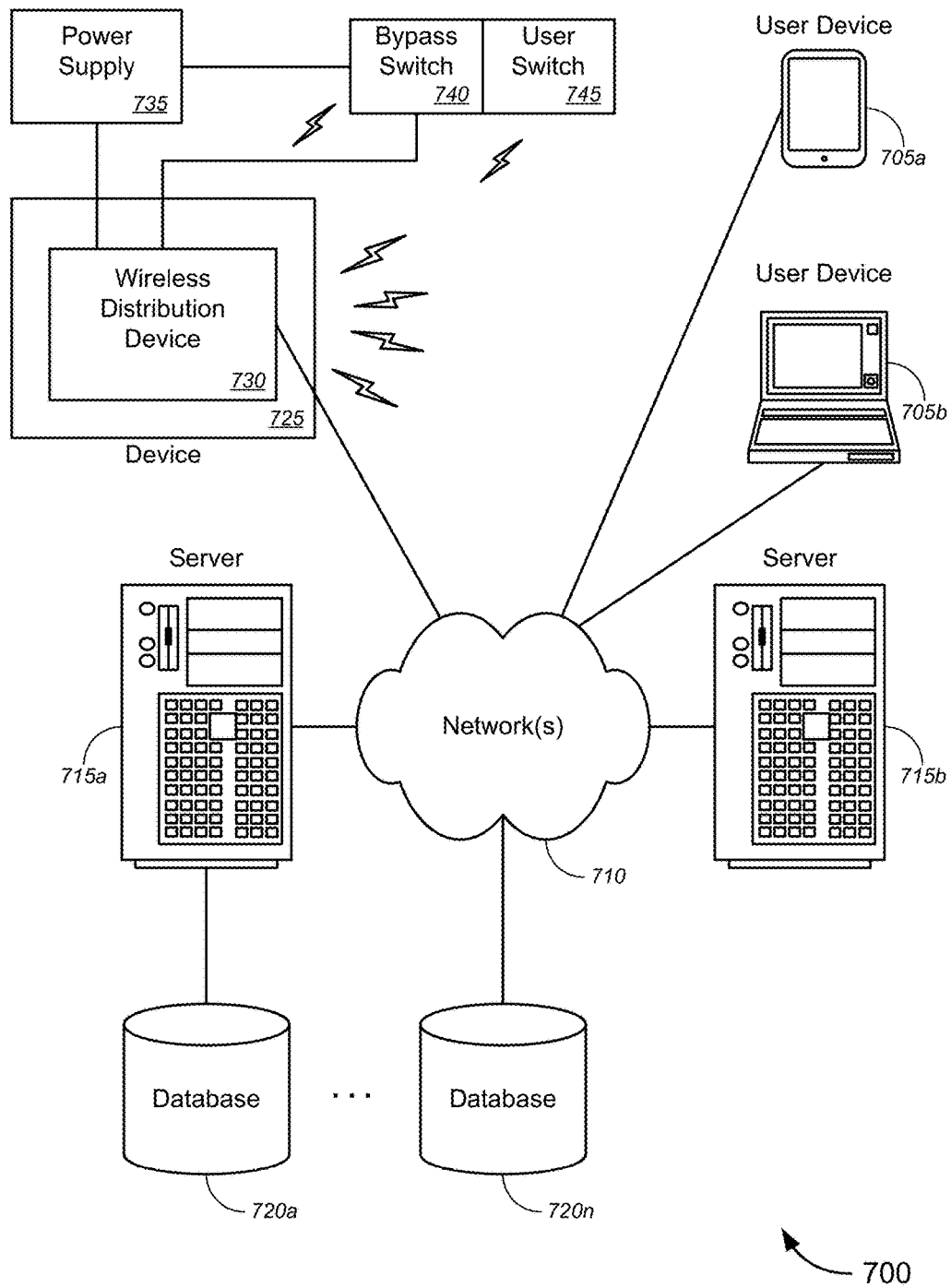
FIG. 7 is a block diagram illustrating a networked system of computers, computing systems, or system hardware architecture, which can be used in accordance with various embodiments.

As noted above, a set of embodiments comprises methods and systems for implementing broadband wireless distribution, and, in particular embodiments, to methods, systems, apparatus, and computer software for implementing distributed broadband wireless implementation in premises electrical devices. FIG. 7 illustrates a schematic diagram of a system 700 that can be used in accordance with one set of embodiments. The system 700 can include one or more user computers, user devices, or customer devices 705. A user computer, user device, or customer device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 705 can also have any of a variety of applications, including one or more applications configured to perform methods provided by various embodiments (as described above, for example), as well as one or more office applications, database client and/or server applications, and/or web browser applications. Alternatively, a user computer, user device, or customer device 705 can be any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user computers, user devices, or customer devices 705, any number of user computers, user devices, or customer devices can be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 710 (similar to networks 145 and 350 FIGS. 1 and 3, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing broadband wireless distribution, and, in particular embodiments, to methods, systems, apparatus, and computer software for implementing distributed broadband wireless implementation in premises electrical devices, or the like, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). The location of each of the databases 720 is discretionary: merely by way of example, a database 720a might reside on a storage medium local to (and/or resident in) a server 715a (and/or a user computer, user device, or customer device 705). Alternatively, a database 720n can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

According to some embodiments, system 700 might further comprise a device 725 (similar to devices 105a-105n, 170a-170n, 305, 375, and 405 of FIGS. 1, 3, and 4, or the like), a wireless distribution device 730 (similar to wireless distribution devices 110a-110b, 175a-175n, 210, 210', 310, 370, 380, and 410 of FIG. 1-4, or the like), a power supply 735 (similar to of power supply 125, 320, 425 FIGS. 1, 3, and 4, or the like), a bypass switch 740 (similar to bypass switches 165a-165n, 335, 440, and 440' of FIGS. 1, 3, and 4, or the like), and a user switch 745 (similar to user switches 160a-160n, 340, and 430 of FIGS. 1, 3, and 4, or the like).

In operation, according to some embodiments, a user might actuate the user switch 745 (e.g., to turn on or off the power to the device 725, or the like). In alternative embodiments, the user might use the user device 705a or 705b to remotely control the device 725 (e.g., to turn it on or off, or the like). The first wireless distribution device 730 might receive the user input (i.e., the input from the user switch 745 or from the user device 705a or 705b), with such user input indicating an operational state of the device 725 (for example, but not limited to, on or off state, or the like). A switching device of the wireless distribution device 730 might switchably supply power to the device 725 via a power line (from power supply 735), based at least in part on the user input, with the supplied power enabling the device 725 to perform its designed functionalities (e.g., for a lighting system, to illuminate an area; and/or the like). Meanwhile, the bypass switch 740 (in some cases, although not all cases, in conjunction with the switching device) ensure that constant power is supplied to a wireless transceiver of the wireless distribution device 730 from the power supply 735—that is, ensuring that the power from the power supply 735 to the wireless transceiver is not turned off. The wireless transceiver relays wireless communications between a service provider access point (e.g., a node or base, such as service node or base 130 and 360 of FIGS. 1 and 3, or the like) and a premises-based wireless network (such as LAN 350 of FIG. 3, or the like). These and other functions of the system 700 (and its components) are described in greater detail above with respect to FIGS. 1-5.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
switchably supplying, with a first switching device of a first wireless distribution device that is disposed within a premises device, power to the premises device via a power line, the supplied power enabling the premises device to perform its designed functionalities, wherein the first switching device comprises a smart switch that allows the supplied power to the premises device to be switched on or off while maintaining constant power, supplied via the power line, to the first wireless transceiver; and
relaying, with a first wireless transceiver of the first wireless distribution device, wireless communications between a service provider access point and a premises-based wireless network.

2. The method of claim 1, wherein the premises device comprises one of a lamp post light, a landscape light, a porch light, a patio light, a garage light, an indoor room light, an indoor lamp, a night light, a fan, a security camera, a security alarm, a sensor device, a motion detector, or an electrical outlet.

3. The method of claim 1, wherein the smart switch is remotely controllable via at least one of the power line using a power-line signal or a wireless communication link established between a user device and the smart switch.

4. The method of claim 3, wherein the user device comprises one of a tablet computer, a desktop computer, a laptop computer, a smart phone, a mobile phone, a portable gaming device, a remote control device, or a personal digital assistant.

5. The method of claim 3, wherein the smart switch is communicatively coupled via the power line to a wall-plate device that controls the smart switch and that is located within a first customer premises, wherein the wall-plate device comprises a second wireless transceiver, and wherein relaying the wireless communications between the service provider access point and the premises-based wireless network comprises relaying, with the first wireless transceiver, the wireless communications between the service provider access point and the premises-based wireless network using broadband-over-power signals via the power line between the smart switch and the second wireless transceiver.

6. The method of claim 1, wherein the first wireless distribution device comprises a bulb socket that is configured to receive a conventional bulb, wherein, when the conventional bulb is inserted in the bulb socket, the smart switch allows power that is supplied to the bulb socket and to the conventional bulb to be switched on or off while maintaining constant power to the first wireless transceiver.

7. The method of claim 1, wherein the premises device is a lighting device, wherein the first wireless distribution device comprises a smart bulb, and wherein the smart bulb allows the power that is supplied to the lighting device to be switched on or off, while maintaining constant power to the first wireless transceiver.

8. The method of claim 1, further comprising:
relaying, with the first wireless transceiver, wireless communications between at least one of the service provider access point or the premises-based wireless network and a second wireless distribution device.

9. The method of claim 8, wherein the second wireless distribution device is located within a first customer premises within which the first wireless distribution device is located.

10. The method of claim 8, wherein the second wireless distribution device is located within a second customer premises that is different from a first customer premises within which the first wireless distribution device is located.

11. The method of claim 8, wherein the second wireless distribution device is mounted on one of a roof-top, a venting pipe, a roof-protruding pipe, a side wall of a building, a louvered side panel, or a vented side panel.

12. An apparatus that is disposed within a premises device, the apparatus comprising:
a first switching device that switchably supplies power to the premises device via a power line, the supplied power enabling the premises device to perform its designed functionalities, wherein the first switching device comprises a smart switch that allows the supplied power to the premises device to be switched on or off while maintaining constant power, supplied via the power line, to the first wireless transceiver; and
a first wireless transceiver that relays wireless communications between a service provider access point and a premises-based wireless network.

13. The apparatus of claim 12, wherein the premises device comprises one of a lamp post light, a landscape light, a porch light, a patio light, a garage light, an indoor room light, an indoor lamp, a night light, a fan, a security camera, a security alarm, a sensor device, a motion detector, or an electrical outlet.

14. The apparatus of claim 12, wherein the smart switch is remotely controllable via at least one of the power line using a power-line signal or a wireless communication link established between a user device and the smart switch.

15. The apparatus of claim 14, wherein the user device comprises one of a tablet computer, a desktop computer, a laptop computer, a smart phone, a mobile phone, a portable gaming device, a remote control device, or a personal digital assistant.

16. The apparatus of claim 14, wherein the smart switch is communicatively coupled via the power line to a wall-plate device that controls the smart switch and that is located within a first customer premises, wherein the wall-plate device comprises a second wireless transceiver, and wherein relaying the wireless communications between the service provider access point and the premises-based wireless network comprises relaying, with the first wireless transceiver, the wireless communications between the service provider access point and the premises-based wireless network using broadband-over-power signals via the power line between the smart switch and the second wireless transceiver.

17. The apparatus of claim 12, wherein the first wireless distribution device comprises a bulb socket that is configured to receive a conventional bulb, wherein, when the conventional bulb is inserted in the bulb socket, the smart switch allows power that is supplied to the bulb socket and to the conventional bulb to be switched on or off while maintaining constant power to the first wireless transceiver.

18. The apparatus of claim 12, wherein the premises device is a lighting device, wherein the first wireless distribution device comprises a smart bulb, and wherein the smart bulb allows the power that is supplied to the lighting device to be switched on or off, while maintaining constant power to the first wireless transceiver.

19. The apparatus of claim 12, wherein the first wireless transceiver further relays wireless communications between at least one of the service provider access point or the premises-based wireless network and a second wireless distribution device.

20. The apparatus of claim 19, wherein the second wireless distribution device is located within a first customer premises within which the first wireless distribution device is located.

21. The apparatus of claim 19, wherein the second wireless distribution device is located within a second customer premises that is different from a first customer premises within which the first wireless distribution device is located.

22. The apparatus of claim 19, wherein the second wireless distribution device is mounted on one of a roof-top, a venting pipe, a roof-protruding pipe, a side wall of a building, a louvered side panel, or a vented side panel.

23. A wireless distribution device that is disposed within a premises device, the wireless distribution device comprising:
a first switching device, wherein the first switching device comprises a smart switch that allows power supplied to the premises device to be switched on or off while maintaining constant power, supplied via a power line, to a first wireless transceiver;
the first wireless transceiver;
at least one processor communicatively coupled to the first switching device and the first wireless transceiver; and
a non-transitory computer readable medium communicatively coupled to the at least one processor, the non-transitory computer readable medium having stored thereon computer software comprising a set of instructions that, when executed by the at least one processor, causes the wireless distribution device to:
switchably supply power to the premises device via the power line, the supplied power enabling the premises device to perform its designed functionalities; and
relay wireless communications between a service provider access point and a premises-based wireless network.

24. A system comprising:
a wireless distribution device that is disposed within a premises device, the wireless distribution device comprising:
a first switching device that switchably supplies power to the premises device via a power line, the supplied power enabling the premises device to perform its designed functionalities, wherein the first switching device comprises a smart switch that allows the supplied power to the premises device to be switched on or off while maintaining constant power, supplied via the power line, to the first wireless transceiver; and
a first wireless transceiver that relays wireless communications between a service provider access point and a premises-based wireless network; and
a bypass power switch that is disposed within a customer premises, the bypass power switch comprising:
a bypass power line that supplies constant power from a power supply to the first wireless transceiver of the wireless distribution device; and
a user input device that detects user input indicating to power on or off the premises device and that sends a signal to the first switching device via at least one of the power line using a power-line signal or a wireless communication link established between a user input device and the first switching device.

* * * * *